United States Patent
Anderson et al.

(10) Patent No.: US 11,396,456 B1
(45) Date of Patent: Jul. 26, 2022

(54) DEVICES, SYSTEMS, AND METHODS FOR REMOVING CONTAMINANTS FROM WATER

(71) Applicants: Renel A. Anderson, Everson, WA (US); Akila G. Karunanayake, Everson, WA (US)

(72) Inventors: Renel A. Anderson, Everson, WA (US); Akila G. Karunanayake, Everson, WA (US)

(*) Notice: Subject to any disclaimer, the term of this patent is extended or adjusted under 35 U.S.C. 154(b) by 0 days.

(21) Appl. No.: 16/291,906

(22) Filed: Mar. 4, 2019

Related U.S. Application Data

(60) Provisional application No. 62/637,893, filed on Mar. 2, 2018.

(51) Int. Cl.
| | |
|---|---|
| C02F 1/28 | (2006.01) |
| C02F 101/20 | (2006.01) |
| C02F 101/32 | (2006.01) |
| C02F 101/36 | (2006.01) |

(52) U.S. Cl.
CPC ............ *C02F 1/28* (2013.01); *C02F 2101/20* (2013.01); *C02F 2101/32* (2013.01); *C02F 2101/36* (2013.01); *C02F 2201/007* (2013.01); *C02F 2301/04* (2013.01)

(58) Field of Classification Search
None
See application file for complete search history.

(56) References Cited

U.S. PATENT DOCUMENTS

| | | | | |
|---|---|---|---|---|
| 3,739,913 A | * | 6/1973 | Bogosian | E02B 15/06 210/242.4 |
| 3,855,152 A | | 12/1974 | Preus | |
| 4,011,175 A | | 3/1977 | Preus | |
| 4,111,813 A | * | 9/1978 | Preus | C02F 1/681 210/282 |
| 5,423,985 A | * | 6/1995 | Addeo | E02B 15/101 210/242.4 |
| 5,863,440 A | * | 1/1999 | Rink | B01D 17/0205 210/693 |
| 6,344,519 B1 | * | 2/2002 | Rink | B01D 17/0202 525/97 |

\* cited by examiner

*Primary Examiner* — Jonathan M Peo
(74) *Attorney, Agent, or Firm* — Schacht Law Office, Inc.; Michael R. Schacht

(57) ABSTRACT

A water treatment system comprises a container, a closure system, at least one loop structure, and remediation media. The container defines a container chamber, a container opening, and at least one container edge. The container opening allows access to the container chamber. The closure system is arranged to allow the container opening to be selectively opened and closed. At least one loop structure is secured to the at least one container edge. The remediation media is disposed within the container chamber. The container is formed of material that allows water to pass from an exterior of the container to the container chamber and thereby come into contact with the remediation media within the container chamber.

6 Claims, 16 Drawing Sheets

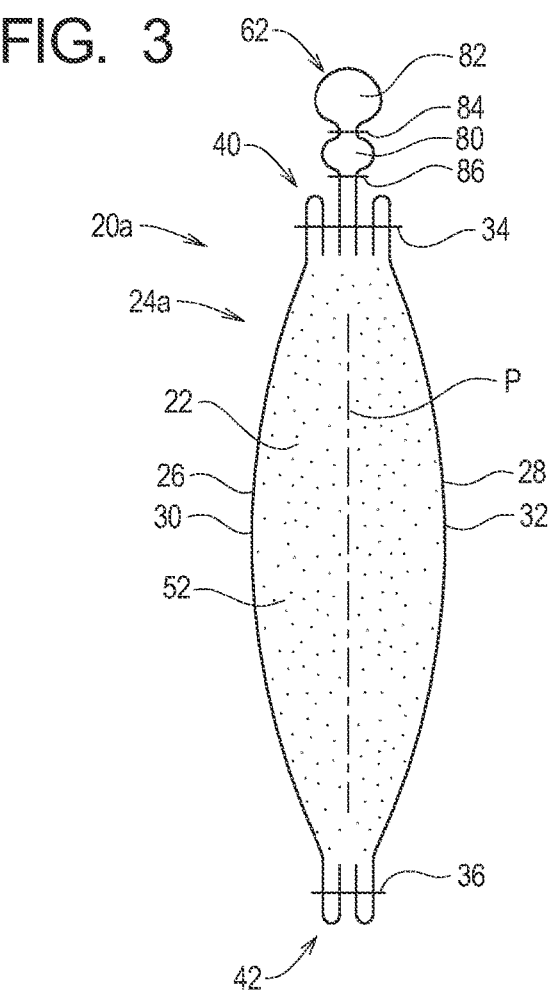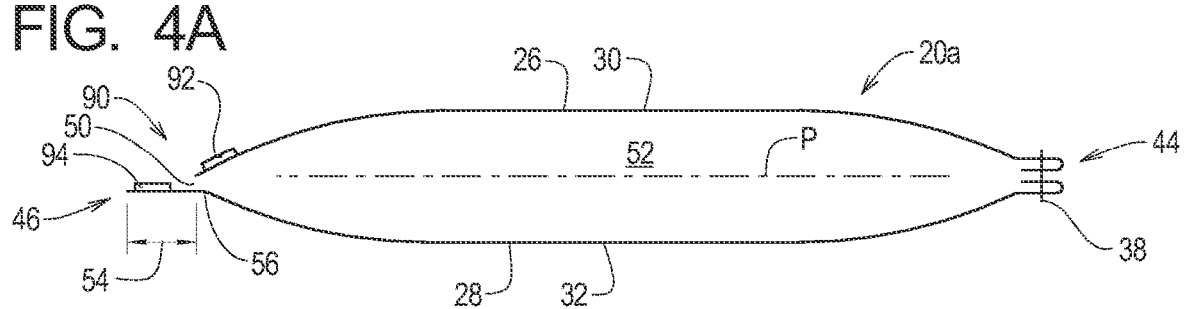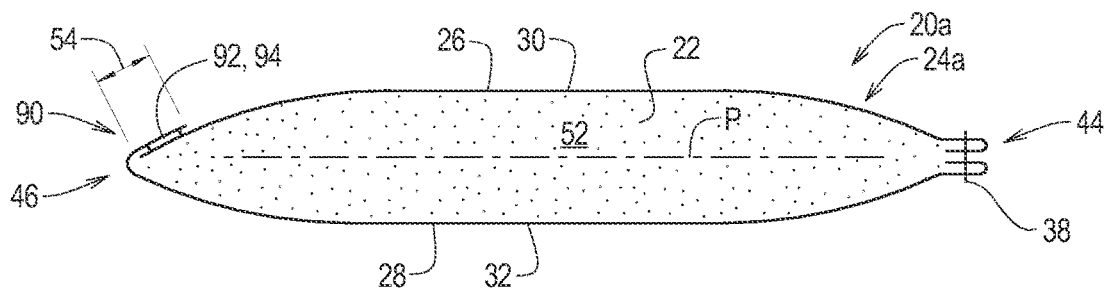

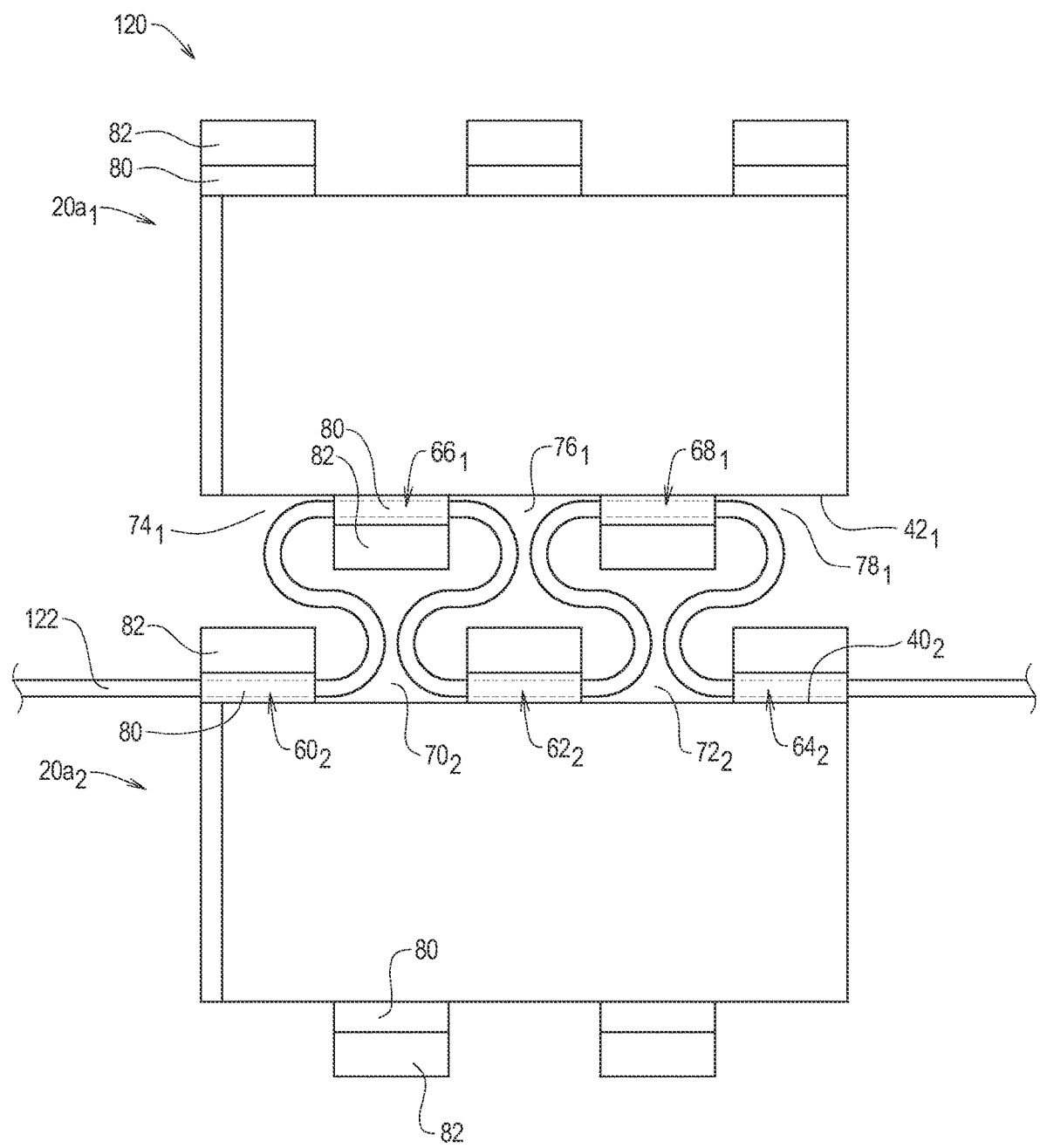

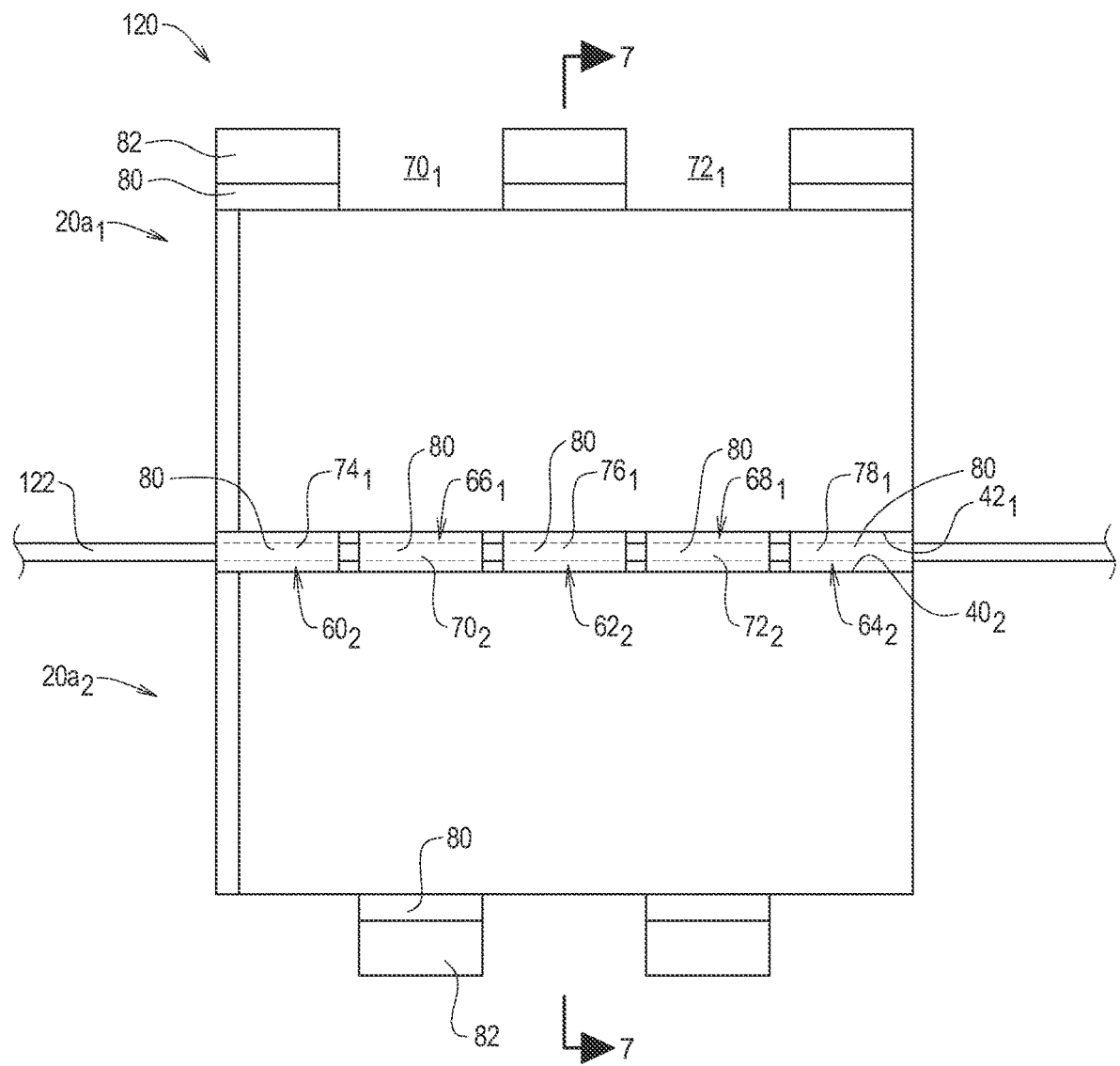

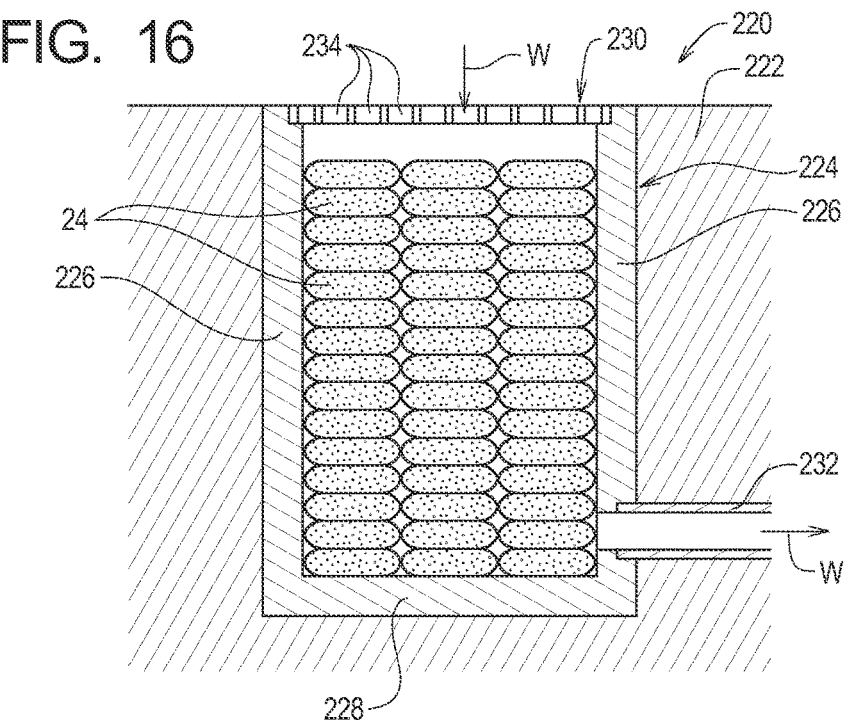
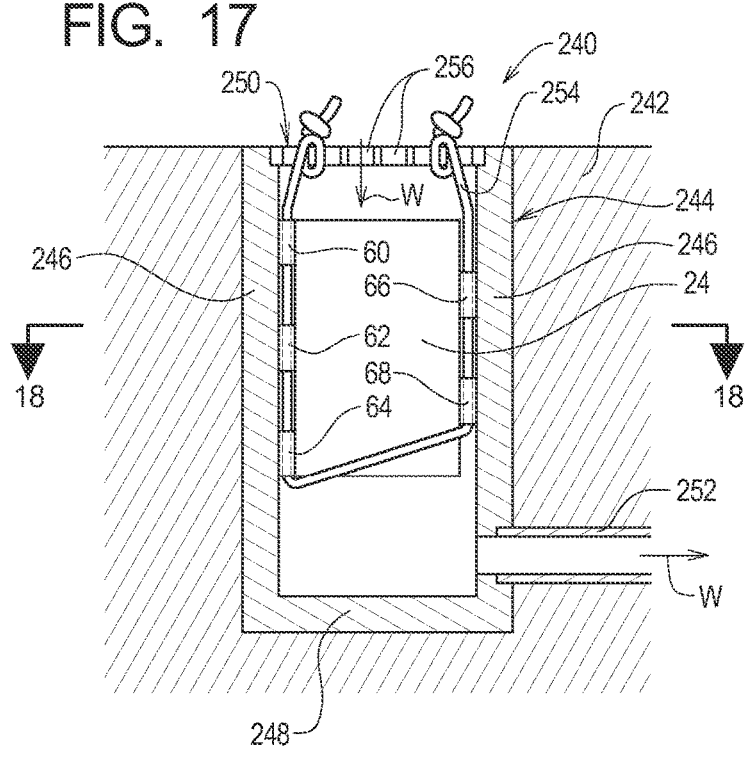
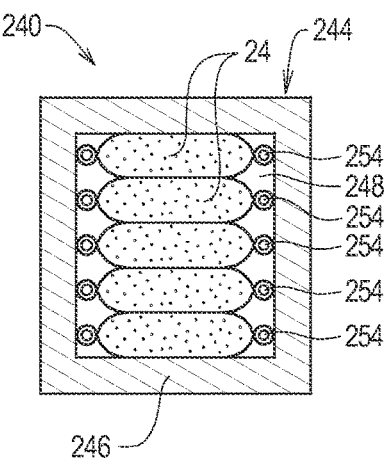

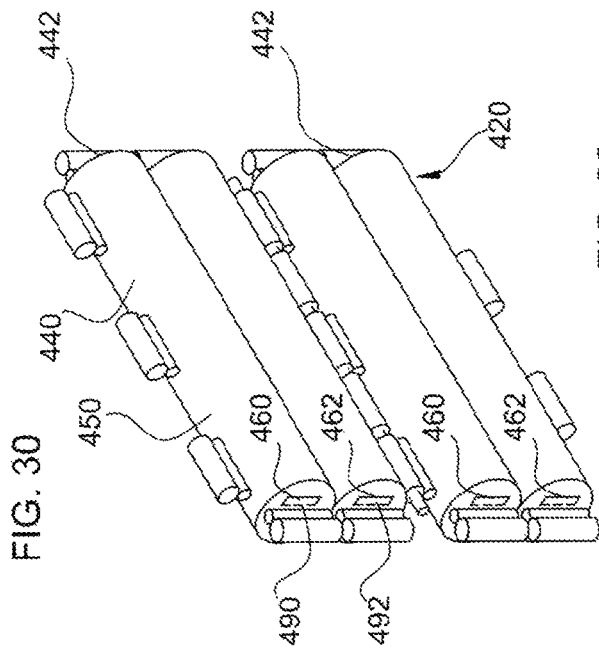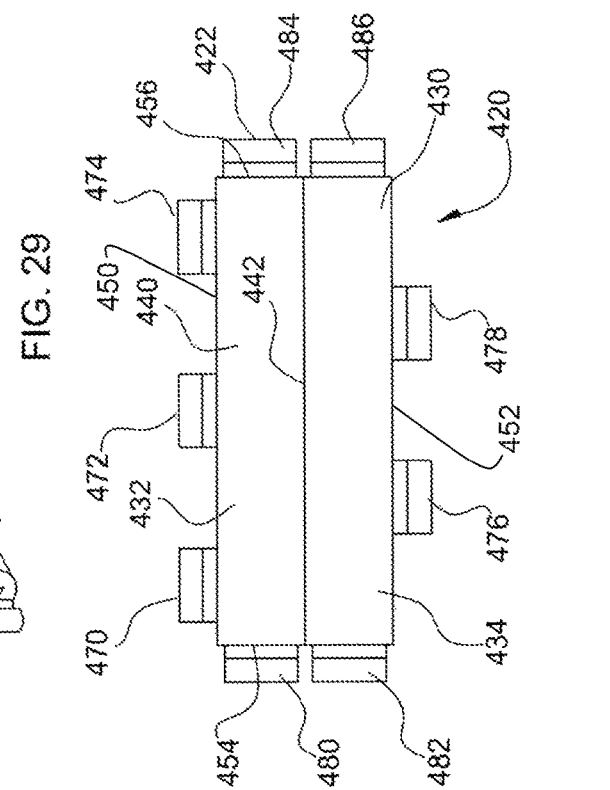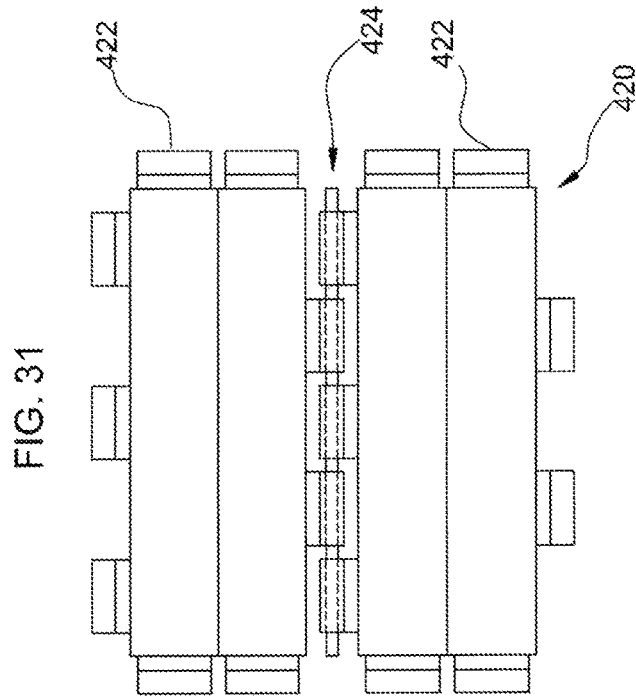

DEVICES, SYSTEMS, AND METHODS FOR REMOVING CONTAMINANTS FROM WATER

RELATED APPLICATIONS

This application U.S. patent application Ser. No. 16/291,906 filed Mar. 4, 2019 claims benefit of U.S. Provisional Application Ser. No. 62/637,893 filed Mar. 2, 2018, the contents of which are incorporated herein by reference.

TECHNICAL FIELD

The present invention relates to materials, methods, and systems for removing contaminants from water, in particular, but also to remove from liquids, soils/sediments, and air. The present invention also relates to devices adapted to support remediation media such that the remediation media treats water in contact with the container and the remediation media within the container. In addition to remediation uses, the devices, materials, methods, and systems of the present invention, when containing appropriate remediation medias, may used for erosion control, reforestation and rehabilitation of tainted, unusable ground. In addition, the devices, materials, methods, and systems of the present invention may further be used initially for site stabilization and later used as for revegetation.

BACKGROUND

The release of harmful contaminants, such as heavy metals, organic pollutants, hydrocarbons, oil, and nutrients, into soils, or areas where they are able to migrate in and through surface or ground water can cause damage to surfaces such as soil and pollution to stormwater, surface water such as, canals, lakes, streams, bays, oceans, ground water, irrigation water, and aquifers. Water treatment devices, systems, and methods have been used for centuries to treat water containing harmful contaminates. Lands have been abandoned as degradation of soils has made life-sustaining agriculture non-viable, or inadequately productive or toxic. Even in the creation of energy via fossil fuels, the very air, needed to sustain health Is impacted. Pathogenic microorganisms, such as e. coliform, *salmonella*, can impair the quality of food sources, and human health may be imperiled by forms of pollution that make their way up the food-chain, or where exposure can happen via contact skin, inhalation, even through government regulated drinking water systems.

Research science has several classification systems of contaminants to lump together like products of concern, yet the regulation and enforcement has been limited and implementation has been slow, while that destructive health effects to ecosystems are becoming increasingly identified. Where contaminated areas are identified, government agencies must work with landowners, developers, state, and regional and municipal governments to abate the problems. Often, remediation projects are expensive, complex, time intensive, and limited in what contaminants are regulated. Other contaminants, perhaps even more detrimental than regulated contaminates, are allowed to remain and may possibly affect a variety of lifeforms in the affected ecosystems and, ultimately, human health. Liquid or gaseous contaminants and dissolved solid contaminants must be removed using one or more of separation, physical removal, chemical treatment, and biological treatment.

Accordingly, contamination of natural bodies of water is preferably avoided rather than treated after contamination. Contamination of natural water bodies is best avoided by preventing contamination of any sources of water feeding the natural water body, and/or by treating water from any contaminated source feeding the natural body of water where prevention is not possible. To prevent contamination of a natural body of water, contaminated water should be treated as close to the source of contamination as possible.

The terms "treat" or "treatment" as used herein refers to partial or complete physical or chemical removal of a contaminant from water and/or to the alteration or neutralization of a contaminant material such that the altered or neutralized material is no longer considered a contaminant. Treatment of a contaminant by physical removal (e.g., filtering) typically yields water containing an amount of the contaminant material below a predetermined maximum acceptable level. Altering or neutralizing a contaminant material (e.g., chemical reaction) modifies the chemical structure of the contaminant material such that contaminant material is below a predetermined maximum level, such that modified chemical structure is no longer considered a contaminant. Other methods such as UV radiation, have success with certain contaminants, but require complex and costly installation and maintenance. Alternatively, the contaminant material may be removed from the body of water at outfall or isolated by making the contaminant bio-unavailable.

The properties of contaminants differ, and water treatment devices, systems, and methods applicable to a first contaminant may differ from water treatment devices, systems, and methods applicable to a second contaminant. A number of factors, such as contaminant type, concentration, solution matrix, and treatment cost, are typically taken into account when choosing a specific water treatment device, system, or method for remediation of water pollution in a given situation where treatment is needed, be that stormwater, moving water, still water such as lakes or wetlands, soil, soil/water-interface, or in ground waters or aquifers.

One known method of treating a body of water is to arrange adsorbents within columns, tanks, vaults and/or pipes and causing the contaminated water to flow through the columns and/or pipes such that the adsorbents treat the contaminated water. The use of columns and/or pipes to support the adsorbents may be problematic for a number of reasons. First, adsorbents can block the columns and/or pipes, reducing or preventing flow of treated water. As another example, the adsorbent can pass through the columns and/or pipes with the water, causing the treated water to have a foul odor and/or an unpleasant taste or the treatment may leave water quality poor tasting and potentially problematic to the health of wellbeing of plants, ecosystems, and humans.

Another known method of treating a body of water is to cause the water to flow through a filter configured to remove contaminants from the treated water. Filters are primarily effective when used to treat particulate contaminants, and non-particulate contaminants are not treatable by physical removal using filters.

However, education and urgency of preservation and understanding of the effects of contaminants are understood by many in the educational community but have not been effectively translated into a comprehensive body of knowledge that allow governments and engineering partners to respond with effective prevention, retardation, removal methods to avoid potentially cataclysmic outcomes.

The need thus exists for remediation media, devices, systems, and methods that can be flexibly installed at point source pollution, or at any position in land or in bodies of water, to isolate, remediate, and/or remove the contaminates such as toxins to below benchmarks, or detectability.

The need further exists for remediation media, devices, systems, and methods that can the combinations of to isolate, remediate, and/or remove the contaminates (e.g., pollutants) that often taint the fields in which food grown, the water in which children play, the bodies of water that fish call home.

The need further exists for remediation media, devices, systems, and methods that can the combinations of to isolate, remediate, and/or remove the contaminates from bodies of water containing effluent that reaching the seas and/or from reservoirs or wells for human consumption.

The need exists for flexible water treatment devices, systems, and methods that can be adapted to treat a body of water containing one or more contaminants without restricting or blocking flow of treated water and without yielding treated water having a foul odor and/or unpleasant taste or unintended chemical residues. The need also exists for water treatment systems and methods that facilitate the treatment of water as close as possible to the source of contamination. The need further exists for water treatment systems and methods that may be tailored to treat a specific contaminant or combination of contaminants generated at a specific source of contamination. The need further exists for water treatment systems and methods that may be tailored to inexpensively accommodate the physical environment associated with the source of contaminated water.

SUMMARY

A water treatment system may be embodied as a water treatment system comprising a container, a closure system, at least one loop structure, and remediation media. The container defines a container chamber, a container opening, and at least one container edge. The container opening allows access to the container chamber. The closure system is arranged to allow the container opening to be selectively opened and closed. At least one loop structure is secured to the at least one container edge. The remediation media is disposed within the container chamber. The container is formed of material that allows water to pass from an exterior of the container to the container chamber and thereby come into contact with the remediation media within the container chamber.

The present invention may also be embodied as a water treatment system comprising a plurality of water treatment sub-systems and at least one joining member. Each water treatment sub-system comprises a container, a closure system, at least one loop structure, and remediation media. The container defines a container chamber, a container opening, and at least one container edge. The container opening allows access to the container chamber. The closure system is arranged to allow the container opening to be selectively opened and closed. At least one loop structure is secured to the at least one container edge. The remediation media is disposed within the container chamber. The container is formed of material that allows water to pass from an exterior of the container to the container chamber and thereby come into contact with the remediation media within the container chamber. The joining member extends through the at least one loop structure of each of the plurality of water treatment sub-systems.

The present invention may also be embodied as a water treatment container comprising material arranged to define a container chamber, a container opening, and first and second container edges, a closure system, and a plurality of loop structures. The container opening allows access to the container chamber. The closure system is arranged to allow the container opening to be selectively opened and closed. The plurality of loop structures are secured to each of the first and second container edges. The material forming the container allows water to pass from an exterior of the container to the container chamber. The loop structures secured to the first container edge are spaced from each according to a first pattern. The loop structures secured to the second container edge are spaced from each according to a second pattern. The first pattern is offset from the second pattern.

BRIEF DESCRIPTION OF THE DRAWINGS

FIG. 3 is a section view of the first example water treatment container taken along lines 3-3 in FIG. 1, the first example water treatment container containing remediation media to form the first example water treatment sub-system;

FIG. 4A is a section view of the first example water treatment container in a fill configuration as taken along lines 4-4 in FIG. 1, the first example water treatment container defining a container chamber and, when in the fill configuration, a container opening;

FIG. 4B is a section view of the first example water treatment container in a use configuration, with remediation media arranged within the container chamber to form the first example water treatment sub-system;

FIG. 5 is a plan view illustrating two of the first example water treatment sub-systems being joined by a joining member to form a first example water treatment system;

FIG. 6 is a plan view illustrating two of the first example water treatment sub-systems joined by the joining member to form the first example water treatment system;

FIG. 16 is an end section elevation view illustrating a plurality of the first example water treatment sub-systems arranged relative to a fourth example site configuration to form a eighth example water treatment system;

FIG. 17 is an end section elevation view illustrating a plurality of the first example water treatment sub-systems being joined by at least one joining member and arranged relative to a fifth example site configuration to form an ninth example water treatment system;

FIG. 18 is a section view of the ninth example water treatment system taken along lines 18-18 in FIG. 17;

FIG. 29 is a front elevation view of an example multi-chamber water treatment sub-system of the present invention;

FIG. 30 is a perspective view illustrating a plurality of the example multi-chamber water treatment sub-systems arranged to form a sixteenth example water treatment system;

FIG. 31 is a front elevation view illustrating the sixteenth example water treatment system;

DETAILED DESCRIPTION

Figure 1:
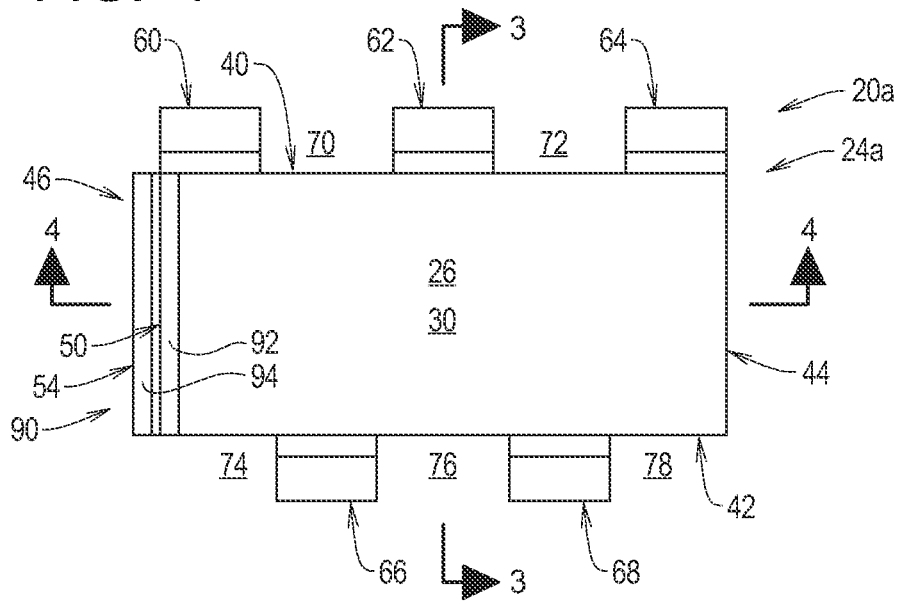
FIG. 1 is a plan view of a first example water treatment container of the present invention, the first example water treatment container forming a first example water treatment sub-system when combined with remediation media.

The present invention comprises at least one water treatment container 20 that is filled with remediation media 22 to form a water treatment system 24. The water treatment sub-systems 24 may be used individually but are typically used as part of a larger water treatment system as will be described below.

In the following discussion, reference characters used without an appended letter generically refer to a given component of the invention, and letters appended to numerical reference characters indicate different types of components. For example, the reference characters 20 generically refer to water treatment containers of the present invention, while the reference character 24 used without suffixes refers to water treatment sub-systems of the present invention that are formed by the combination of treatment containers 20 and remediation media 22. Letter suffixes added to the reference characters 20 and 24 indicate different types of water treatment containers and water treatment sub-systems, respectively.

The remediation media 22 may comprise one or more active ingredient, fillers, stabilizers, and other materials to provide a desired water treatment functionality when brought into contact with water to be treated. Treated water or water to be treated will be referred to in the following discussion and/or associated drawing figures using the reference character underscored "W" (i.e., "$\underline{W}$") when static (e.g., pond or lake) and, when moving or flowing (e.g., stream, river, runoff), with the reference character "W" without underscoring. Moving water will be referred to in the drawing figures associated with the following discussion using an arrow (i.e., "→") showing normal flow direction of the moving water within the context of the drawing figure.

The remediation media 22 may come in different types, and the water treatment sub-systems 24 forming a larger water treatment system may be filled with different types of remediation media 22 as will be described in further detail below. Remediation media 22 of particular significance when used with the treatment containers 20 of the present invention include biochar, modified biochar, and/or other adsorbent used in remediation industry. Examples of one type of remediation media 22 that may be combined with one of the treatment containers 20 to form the water treatment sub-systems 24 is identified in U.S. Provisional Patent Application Ser. No. 62/637,904 and the co-pending application corresponding to attorney matter number P219445, both of which are incorporated herein by reference.

In the following discussion, first and second examples of water treatment containers 20 and water treatment sub-systems 24 will initially be described, after which several example water treatment systems employing the water treatment containers 20 and/or water treatment sub-systems 24 of the present invention will be described separately below.

I. First and Second Example Water Treatment Sub-Systems

Referring now to FIGS. 1, 3, 4A, and 4B of the drawing, depicted therein is an example rectangular water treatment system 20a constructed in accordance with, and embodying, the principles of the present invention. FIG. 2 depicts an example rectangular water treatment container 20a constructed in accordance with, and embodying, the principles of the present invention. The example rectangular water treatment container 20a is combined with remediation media 22 to form a first example water treatment sub-system 24a as shown in FIGS. 3 and 4B, and the example square water treatment container 20b is combined with remediation media 22 to form a second example water treatment sub-system 24b.

The example rectangular water treatment container 20a and second example water treatment containers 20b differ in configuration and possibly size: the first example water treatment sub-system 20a is rectangular in plan view, while the second example water treatment sub-system 20b is square in plan view. The first and second example water treatment containers 20a and 20b are or may be implemented using similar constructions and fabrication techniques, and only the example rectangular water treatment container 20a will be described in detail below with the understanding that that explanation may also apply to the second example water treatment container 20b.

As will be described in further detail below, the water treatment containers 20 of the present invention are flexible structures defining an internal chamber that is filled with the remediation media 22. The water treatment containers 20 of the present invention can take various shapes in side or end elevation views. In particular, water treatment containers 20 of the present invention can be made in shapes other than rectangular or square (e.g., circular or triangular) and may come in different sizes. FIGS. 3 and 4B illustrate that the example rectangular water treatment container 20a defines curved but roughly parallel first and second outer surfaces 26 and 28 as shown in FIGS. 3 and 4B and as will be described in further detail below. The first and second outer 26 and 28 may take the form of convex surfaces as shown in FIGS. 3 and 4B so that the example water treatment sub-systems 24 are pillow-shaped, or the first and second outer surfaces 26 and 28 may be formed to define other shapes (e.g., spherical or pyramidal). Useful measures of treatment capacity of any given water treatment sub-system 24 formed by a water treatment sub-system 20 are volume when filled with remediation media 22, height (e.g., largest distance between first and second outer surfaces 26 and 28 in use), and surface area (e.g., surface area of one or both of the outer surfaces 26 and 28).

FIGS. 3, 4A, and 4B further illustrate that the water treatment sub-systems 24 of the present invention further define a reference plane P. The reference plane P generally extends between the first and second outer surfaces 26 and 28 when the water treatment sub-system 24 is installed and in use. The example water treatment containers 20, and thus the water treatment sub-systems 24 formed thereby, are flexible and thus not strictly planar, and the reference plane P shall be understood to refer to an abstract property of the water treatment sub-systems 24 of the present invention that is defined for reference purposes only.

FIGS. 1, 3, 4A, and 4B illustrate that the example rectangular water treatment container 20a comprises first and second panels 30 and 32 joined together by a first side stitch 34, a second side stitch 36, and an end stitch 38. First and second side edges 40 and 42 of the example rectangular water treatment container 20a are defined by the first and second side stitches 34 and 36, respectively. The first end stitch 48 defines a first end edge 44 of the example rectangular water treatment container 20a. A second end edge 46 of the example rectangular water treatment container 20a defines a container opening 50 that allows access to a container chamber 52 within the example rectangular water treatment container 20a. An overlap portion 54 of the second panel 32 is folded at a fold line 46 to define the second end edge 46.

The example first and second panels 30 and 32 are made of a flexible material that functions to contain the remediation media 22 within the container chamber 52. The material forming the example first and second panels 30 and 32 further allows water to soak or flow through the example water treatment container 20a to come into contact with the remediation media 22. The example first and second panels 30 and 32 are made of a woven fabric. The woven fabric from which the panels 30 and 32 are formed may be made of fibers and/or ribbons made of chemically resistant nylon, polypropylene, polyester, biodegradable cotton, or similar materials. The micron ratings of the material employed can be 0.5 to 400. The material from which the fabric is made is desirably nontoxic, does not release fibers during normal use, is user friendly, and is reusable.

The example rectangular water treatment container 20a further defines first, second, and third loop structures 60, 62, and 64 extending from the first side edge 40 and fourth and fifth loop structures 66 and 68 extending from the second side edge 42. A first notch region 70 is defined between the first and second loop structures 60 and 62, and a second notch region 72 is defined between the second and third loop structures 62 and 64. A third notch region 74 is defined between the second end edge 46 and the fourth loop structure 66. A fourth notch region 76 is defined between the fourth loop structure 66 and the fifth loop structure 68. A fifth notch region 78 is defined between the first end edge 48 and the fifth loop structure 68. The first, second, and third loop structures 60, 62, and 64 thus define a first pattern, the fourth and fifth loop structures 66 and 68 define a second pattern, and the first and second patterns are offset relative to each other.

The example water treatment containers 20a and 20b thus each define first and second side edges 40 and 42, with three loop structures 60-64 extending from the first side edge 40 and two loop structures 66 and 68 extending from the second side edge 42. Further, two notch regions 70 and 72 are defined adjacent to the first side edge 40, and three notch regions 74-78 are defined adjacent to the second side edge 42. The loop structures 60-68 are sized and dimensioned such that the first, second, and third loop structures 60-64 are offset from the fourth and fifth loop structures 66 and 68 and such that the first and second notch regions 70 and 72 are offset from the third, fourth, and fifth notch regions 74-78.

The loop structures 60-68 of one of the rectangular water treatment containers 20a are thus sized, dimensioned, and spaced such that the first and second notch regions 76 and 78 of a first rectangular water treatment container 20a are capable of receiving the first and second loop structures 60 and 62 of a second rectangular water treatment container 20a and such that the third, fourth, and fifth notch regions 70-74 of the first rectangular water treatment container 20a are capable of receiving the third, fourth, and fifth loop structures 64-68 of the second rectangular water treatment container 20a. When all of the loop structures on one side edge line up with and are received by all of the notch regions on the side edge of one container 20a, the adjacent side edges of the containers 20a are referred to as being "mated" together. It should be noted that the loop structures 60-68 of the example rectangular and square water treatment containers 20a and 20b are similarly sized, dimensioned, and spaced to allow the square water treatment container 20b to mate with a rectangular water treatment container 20a.

The example loop structures 60-68 are made of a fabric such as strapping material. The fabric from which the loop structures 60-68 may be made of fibers and/or ribbons made of chemically resistant nylon, polypropylene, polyester, biodegradable cotton, or similar materials. The micron ratings of the material employed can be 0.5 to 400. The material from which the fabric is made is desirably nontoxic, does not release fibers during normal use, is user friendly, and is reusable.

The example loop structures 60-68 are identical and each defines a proximal loop portion 80 and a distal loop portion 82. In particular, as perhaps best shown in FIG. 3, the example loop structures 60-68 are each formed by a strip of flexible material sewn in a loop to the first and second panels 30 and 32 by one of the side stitches 34 and 36. FIG. 3 also shows that a first loop stitch 84 is sewn into the example loop structures 60-68 to separate the loop formed thereby into the proximal and distal loop portions 80 and 82. Optionally, a second loop stitch 86 may be sewn into the example loop structures 60-68 to define the distal loop portion 82. Without the optional second loop stitch 86, the example distal loop portion 82 is formed between the adjacent side stitch 34 or 36 and the first loop stitch 84. FIG. 3 further illustrates that the example distal loop portions 82 are larger in cross-sectional area when open than the example proximal loop portions 80. The loop structures 60-68 may be formed with proximal and distal loop portions 80 and 82 that are the same size, or the proximal loop portion 80 may be larger than the distal loop portions 82.

Figure 2:
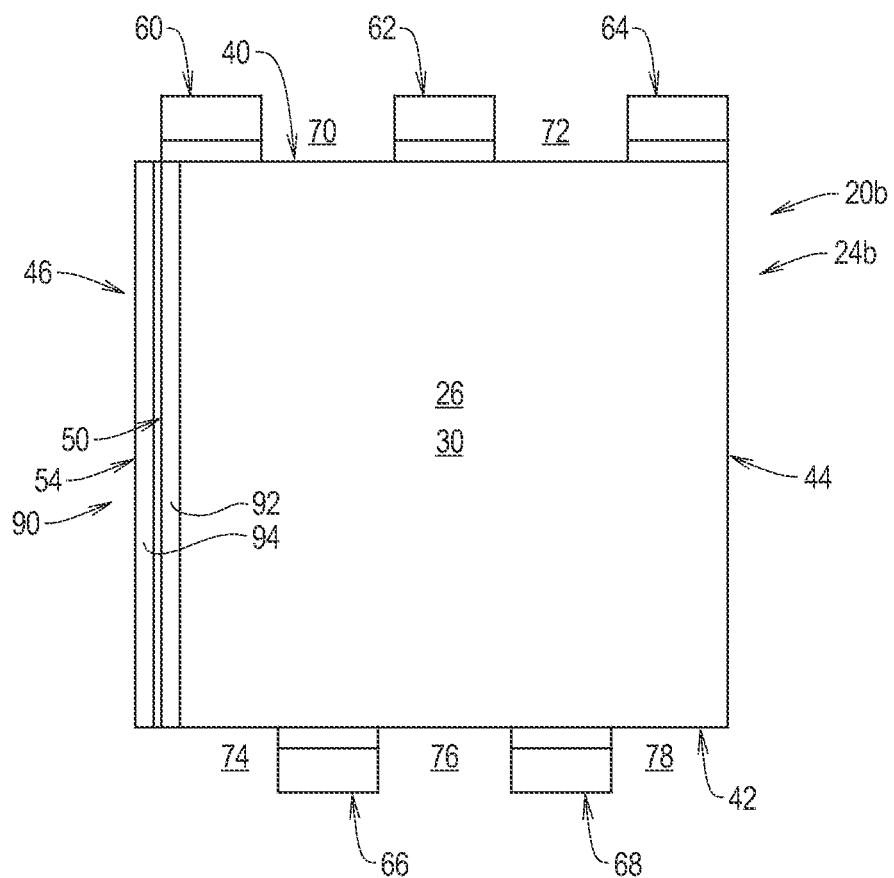
FIG. 2 is a plan view of a second example water treatment container of the present invention, the second water treatment container forming a second example water treatment sub-system when combined with remediation media.

FIGS. 1, 4A and 4B further illustrate that a closure system 90 may be arranged to allow the container opening 50 to be closed. With the closure system 90 in an open configuration as shown in FIG. 4A, remediation material 22 and/or other items may be inserted into the container chamber 52 through the container opening 50. With the closure system 90 in a closed configuration as shown in FIG. 4B, removal of remediation material 22 and/or any other items within the container chamber 52 is substantially inhibited.

The example closure system 90 comprises a first closure strip 92 and a second closure strip 94. The example first closure strip 92 is one portion of a hook and loop fastener, while the second closure strip 94 is another portion of a hook and loop fastener. Alternatively, a zipper with non-metallic or well-painted teeth and pulls can be utilized as may be appropriate for the particular treatment needs after assessment. The first and second closure strips 92 and 94 mechanically engage each other to join the overlap region 54 to the outer surface 26 of the first panel 30 adjacent to the second side edge 46, thereby closing the container opening 50. Alternative closure systems to the example hook and loop fastener system 90 include zippers and pressure sensitive adhesive strips. The closure system 90 may be single use (e.g. pressure sensitive adhesive strip) or may be adapted to be selectively opened and closed for numerous uses (e.g. hook and loop fastener or zipper). If a zipper is used, the zipper should be formed of plastic material to prevent corrosion and allow refill of bag with fresh media.

Either of the first and second example water treatment sub-systems 24a and 24b formed by the first and second water treatment containers 20a and 20b, respectively, may be used alone to treat water. For example, one of the example water treatment sub-systems 24a and 24b may be installed in a culvert so that water passing through the culvert comes into contact with the remediation media 22 within the treatment sub-system 24a or 24b. As described above, however, a number of water treatment sub-systems 24 are typically combined to form a water treatment system comprising multiple sub-systems 24.

The water treatment sub-systems 24 formed by the water treatment containers 20 are environmentally-friendly and less expensive in comparison to other water treatments. Also, the use of the sub-systems 24 can avoid more time-consuming steps like centrifugation and filtration in treatment plants. The water treatment sub-systems 24 can be used in lakes, streams, ponds, saltwater and fresh water wetlands, storm drains, catch basins, roadways, parking lots, bioretention, soil-water interface, or any other water treatment infrastructures or earthen structures. The example water treatment sub-systems including remediation media is capable of effectively removing contaminants from water including heavy metals, organic pollutants including PFOA, hydrocarbons, coliform, and *enterococcus* bacteria simultaneously.

II. First Example Water Treatment System

Figure 7:
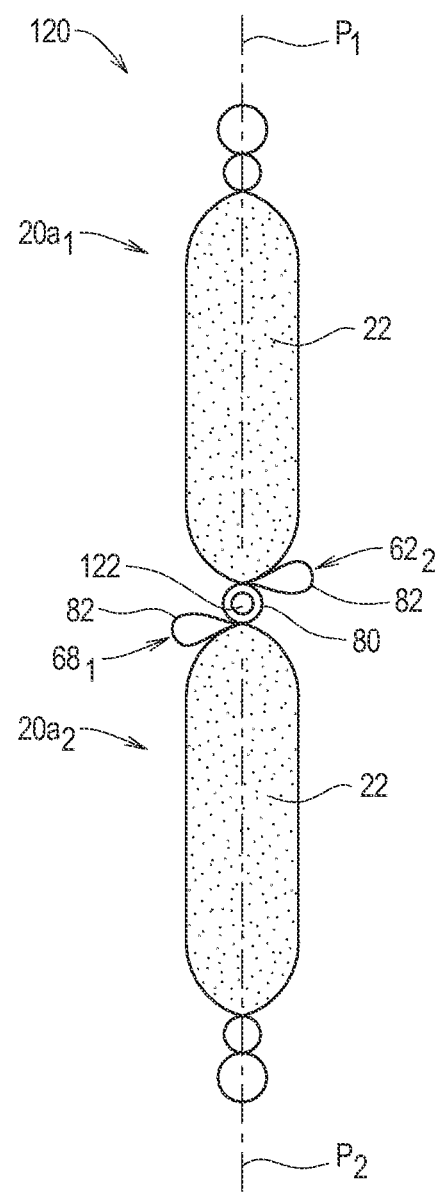
FIG. 7 is an end view taken along lines 7-7 in FIG. 6 illustrating two of the first example water treatment sub-systems joined by the joining member to form the first example water treatment system.

Turning now to FIGS. 5-7, a first example water treatment system 120 will now be described. The first water treatment system 120 comprises a first rectangular water treatment sub-system $20a_1$ and a second rectangular water treatment sub-system $20a_2$. In the following discussion, subscripted numerals appended to numerical reference characters indicate specific instances of a component of the invention and are not different from that component.

The first and second rectangular water treatment sub-systems $24a_1$ and $24a_2$ are arranged such that the second side edge $42_1$ of the first subsystem $24a_1$ is in a mated relationship with the first side edge $40_2$ of the second subsystem 24a2 as shown in FIGS. 5 and 6. A joining member 122 is inserted through the proximal loop portions 80 of the mated loop structures $60_2$, $66_1$, $62_2$, $68_1$, and $64_2$ as shown in FIG. 5.

The first example water treatment system 120 is formed by drawing the first and second rectangular water treatment systems $24a_1$ and $24b_1$ together and applying tension to the joining member 122 as shown in FIGS. 6 and 7. The distal loop portions 82 are unused in the first example water treatment system 120 as shown in FIG. 7. The example joining member 122 is an elongate member, such as a rope, line, or cable, capable of maintaining the first and second rectangular water treatment systems $20a_1$ and $20a_2$ in the mated configuration as shown in FIG. 6 during normal use of the first example water treatment system 120. With the first subsystem $20a_1$ in the mated relationship with the second subsystem $20a_2$ as shown in FIG. 5 and after the joining member 122 is tensioned as shown in FIG. 6, loop structures $60_2$, $62_2$ and $64_2$ of the second water treatment subsystem $20a_2$ are located within notch regions $74_1$, $76_1$, and $78_1$ defined by the first water treatment subsystem $20a_1$ and loop structures $66_1$ and $68_1$ of the first water treatment subsystem $20a_1$ are located within notch regions 702 and 722 defined by the second water treatment subsystem $20a_2$.

The first example water treatment system 120 is capable of treating more water than either of the first and second example rectangular water treatment sub-systems $24a_1$ and $24a_2$ used individually.

III. Second Example Water Treatment System

Figure 8:
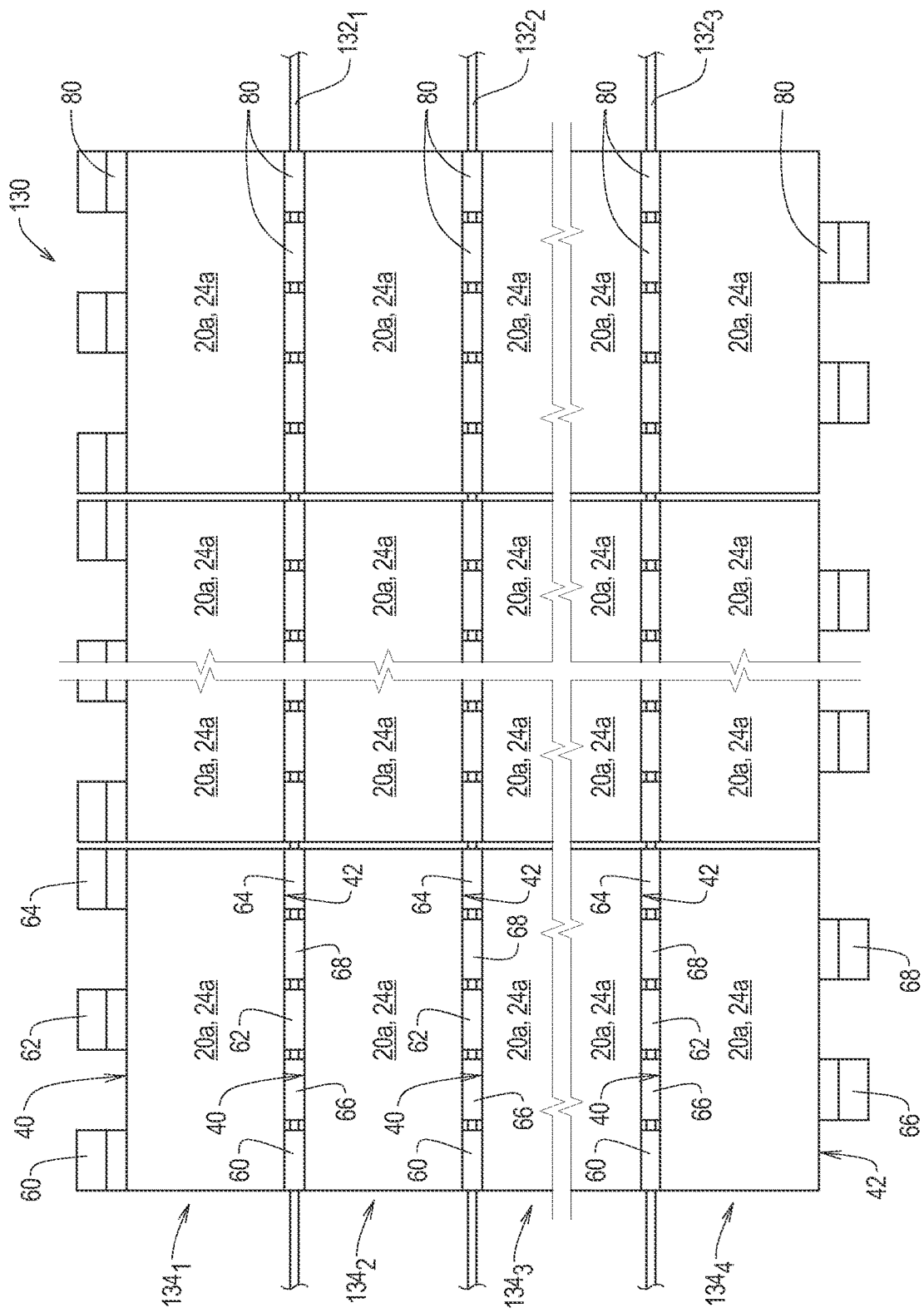
FIG. 8 is a plan view illustrating a plurality of rows of the first example water treatment sub-systems joined by a plurality of joining members to form a second example water treatment system.

Turning now to FIG. 8 of the drawing, a second example water treatment system 130 will now be described. The second water treatment system 130 comprises a plurality of the rectangular water treatment sub-systems 24a connected by a plurality of joining members 132 to define an array.

The plurality of rectangular water treatment sub-systems 24 are arranged such that the second side edges 42 of the sub-systems 24 in a first row $134_1$ are in mated relationships with the first side edges 40 of the subsystems 24 in a second row $134_2$. Similarly, the second side edges 42 of the sub-systems 24 in the second row $134_2$ are in mated relationships with the first side edges 40 of the subsystems 24 in a third row $134_3$. The second side edges 42 of the sub-systems 24 in the third row $134_3$ are in mated relationships with the first side edges 40 of the subsystems 24 in a fourth row $134_4$. First, second, and third joining members $132_1$, $132_2$, and $132_3$ are inserted through the proximal loop portions 80 of each of the mated loop structures 60-68 of the sub-systems 24 in the adjacent rows $134_1$ and $134_2$, $134_2$ and $134_3$, and $134_3$ and $134_4$, respectively.

The second example water treatment system 130 is formed by connecting the rows 134 of water treatment subsystems 24 together and applying tension to the joining members 132. The example joining members 132 are elongate members, such as a rope, line, or cable, capable of maintaining the water treatment sub-systems 24 in the mated configuration as shown in FIG. 8 during normal use of the first example water treatment system 120.

The first example water treatment system 130 is capable of treating more water than the first example water treatment system 120 or either of the first and second example rectangular water treatment sub-systems $24a_1$ and $24a_2$ used individually.

IV. Third Example Water Treatment System

Figure 9:
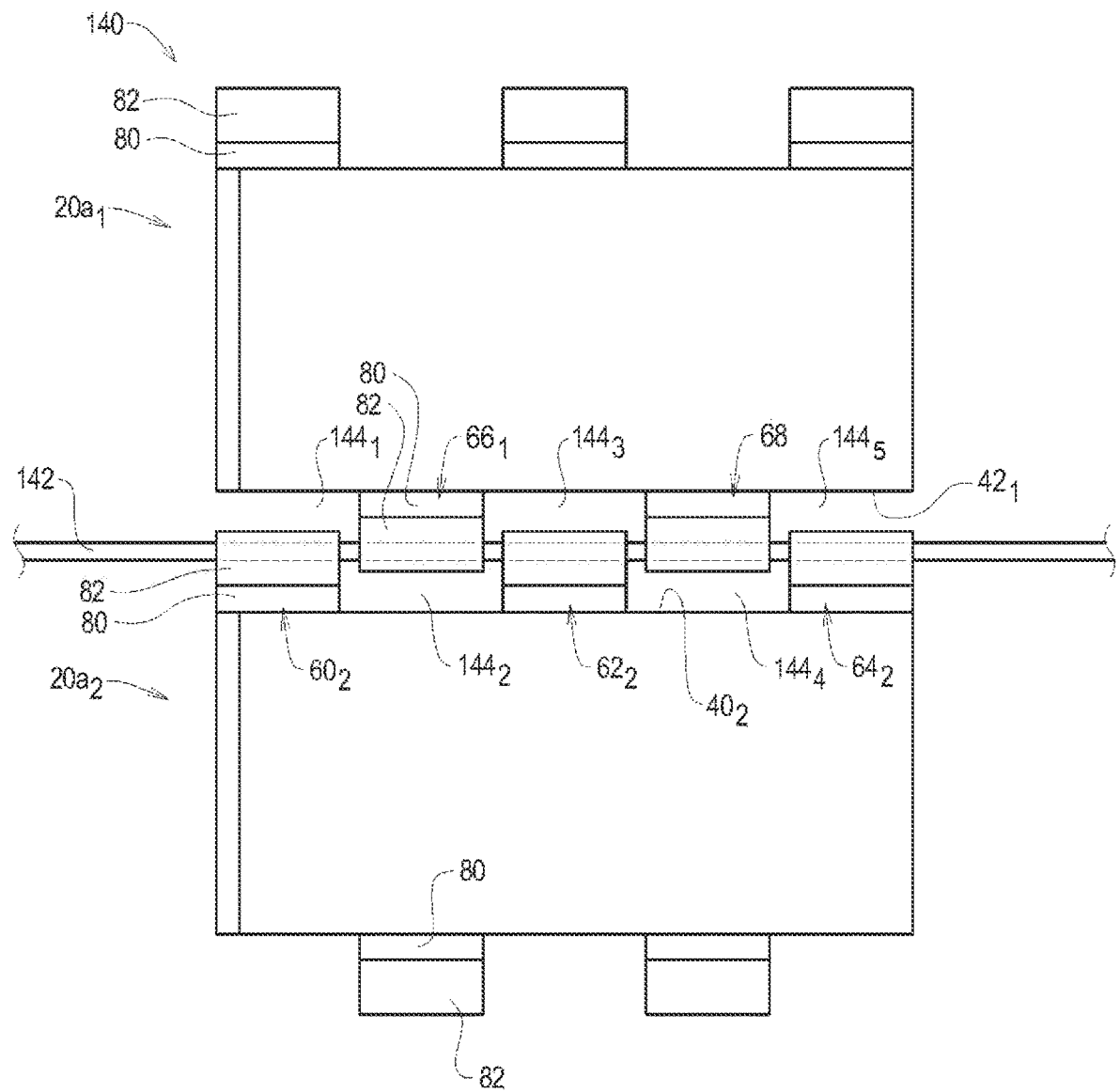
FIG. 9 is a plan view illustrating two of the first example water treatment sub-systems being joined by a joining member to form a third example water treatment system, the third example water treatment system being depicted in a first configuration.
Figure 10:
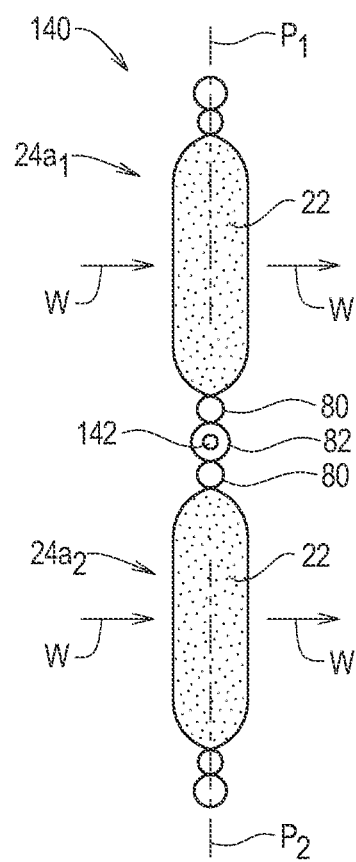
FIG. 10 is an end section view illustrating the third example water treatment system in the first configuration.
Figure 11:
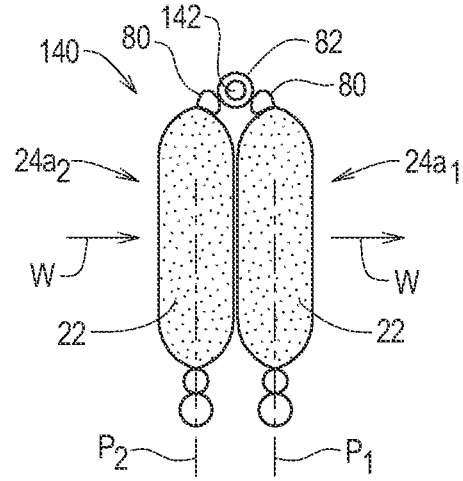
FIG. 11 is an end section view illustrating the third example water treatment system in a second configuration.

Turning now to FIGS. 9-11, a third example water treatment system 140 will now be described. The third example water treatment system 140 comprises a first rectangular water treatment sub-system $20a_1$ and a second rectangular water treatment sub-system $20a_2$. The first and second rectangular water treatment sub-systems $20a_1$ and $20a_2$ are arranged such that the second side edge $42_1$ of the first subsystem $20a_1$ is in a mated relationship with the first side edge 402 of the second subsystem $24a_2$ as shown in FIG. 9, and a joining member 142 is inserted through the distal loop portions 82 of the mated loop structures $60_2$, $66_1$, $62_2$, $68_1$, and $64_2$.

The third example water treatment system 140 is formed by drawing the first and second rectangular water treatment systems $24a_1$ and $24b_1$ together and applying tension to the joining member 142 as shown in FIG. 9. The proximal loop portions 80 are unused in the third example water treatment system 140. The example joining member 142 is an elongate member, such as a rope, line, or cable, capable of maintaining the first and second rectangular water treatment systems $24a_1$ and $24a_2$ in the mated configuration as shown in FIG. 6 during normal use of the first example water treatment system 120.

When used in an aligned configuration as shown in FIG. 10, reference planes P1 and P2 of the water treatment sub-systems $24a_1$ and $24a_2$ are substantially coplanar, and gaps $144_1$, $144_2$, $144_3$, $144_4$, and $144_5$ are formed between the adjacent rectangular water treatment sub-systems $24a_1$ and $24a_2$ to allow water flow between the sub-systems $24a_1$ and $24a_2$. The gaps $144_1$, $144_2$, $144_3$, $144_4$, and $144_5$ provide slack that allows the water treatment sub-systems $24a_1$ and $24a_2$ to be used in a parallel configuration as shown in FIG. 11. When used in the parallel configuration, reference planes P1 and P2 of the water treatment sub-systems $24a_1$ and $24a_2$ are spaced and parallel coplanar.

The first example water treatment system 120 is capable of treating more water than either of the first and second example rectangular water treatment sub-systems $24a_1$ and $24a_2$ used individually.

V. Fourth Example Water Treatment System

Figure 12:
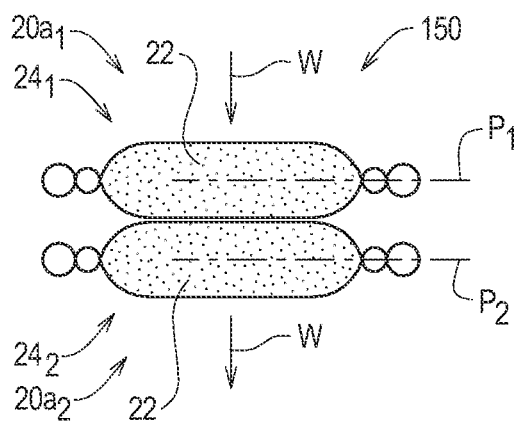
FIG. 12 is an end section view illustrating two of the first example water treatment sub-systems arranged to form a fourth example water treatment system.

Turning now to FIG. 12, a fourth example water treatment system 150 will now be described. The fourth example water treatment system 150 comprises a first water treatment sub-system $24_1$ and a second water treatment sub-system $24_2$. The first and second water treatment sub-systems $24_1$ and $24_2$ are simply stacked one on top of the other in a parallel configuration. In the parallel configuration, reference planes P1 and P2 of the water treatment sub-systems $24a_1$ and $24a_2$ are spaced and parallel coplanar.

The first example water treatment system 120 is capable of treating more water than either of the first and second example rectangular water treatment sub-systems $24a_1$ and $24a_2$ used individually.

VI. Fifth Example Water Treatment System

Figure 13:
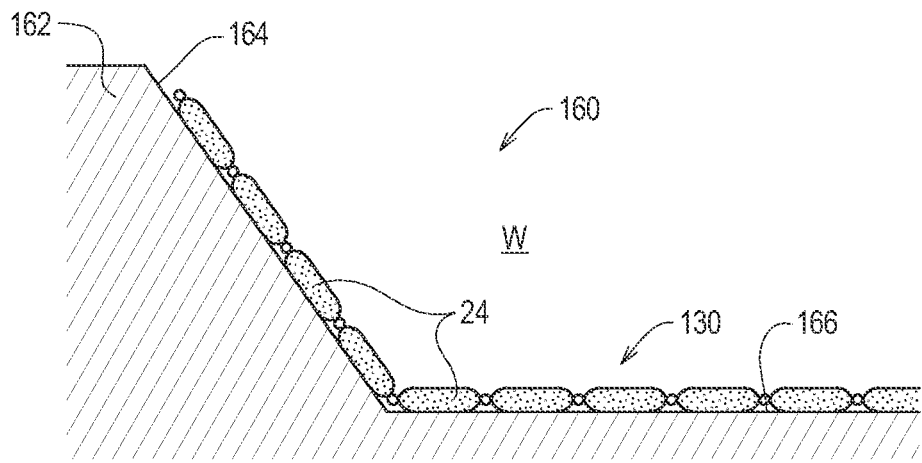
FIG. 13 is an end elevation view illustrating a plurality of the first example water treatment sub-systems being joined by a plurality of joining members and arranged relative to a first example site configuration to form a fifth example water treatment system.

Turning now to FIG. 13, a fifth example water treatment system 160 will now be described. The fifth example water treatment system 160 is formed by arranging the second example water treatment system 130 on an earthen structure 162 comprising an inclined portion 164 and a substantially horizontal portion 166. Part of the second example water treatment system 130 is arranged on the inclined portion 162, and part of the example water treatment system 130 is arranged on the substantially horizontal portion 166. Standing water W is treated when in contact with the second example water treatment system 130.

VII. Sixth Example Water Treatment System

Figure 14:
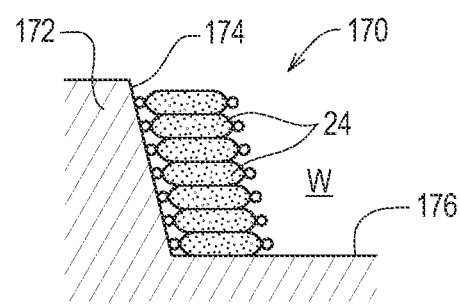
FIG. 14 is an end section elevation view illustrating a plurality of the first example water treatment sub-systems arranged relative to a second site configuration to form an sixth example water treatment system.

FIG. 14 depicts a sixth example water treatment system 170. The sixth example water treatment system 170 is formed by arranging a stack of the example water treatment sub-systems 24 relative to an earthen structure 172 defining an inclined portion 174 and a substantially horizontal portion 176. In particular, the water treatment sub-systems 24 are stacked on the substantially horizontal portion 176 and lean against the inclined portion 162. Standing water W is treated when in contact with the example water treatment sub-systems 24.

VIII. Seventh Example Water Treatment System

Figure 15:
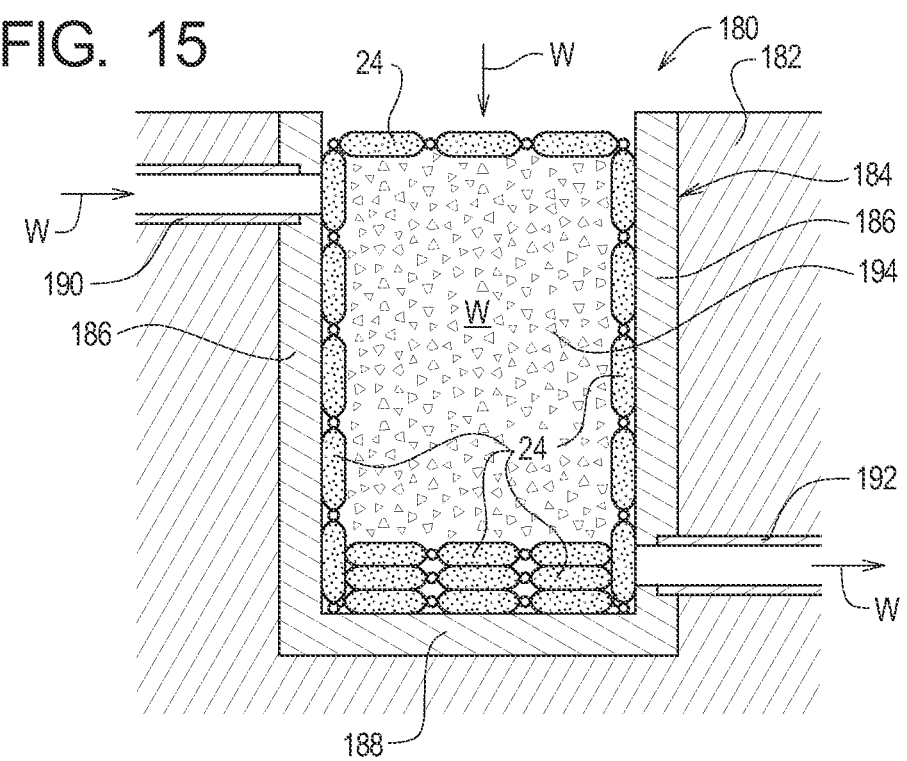
FIG. 15 is an end section elevation view illustrating a plurality of the first example water treatment sub-systems arranged relative to a third example site configuration to form a seventh example water treatment system.

FIG. 15 depicts a seventh example water treatment system 180. The seventh example water treatment system 180 is formed by arranging a plurality of the example water treatment sub-systems 24 in a desired relationship relative to an earthen structure 182 supporting a vault 184 defining side walls 186 and a bottom wall 188. An inlet pipe 190 is arranged to direct water into the vault 184, and an outlet pipe is arranged to allow water to flow out of the vault 184. A plurality of the water treatment sub-systems 24 are arranged on the bottom wall 188 of the vault 184 to a point above the outlet pipe 192. A plurality of the water treatment sub-systems 24 are stacked along the side walls 186 of the vault 184. Fill material 194 is arranged on top of the sub-systems 24 on the bottom wall 188 to support the sub-systems 24 lining the side walls 186. A plurality of the water treatment sub-systems 24 are arranged on top of the fill material 194 above the inlet pipe 190. Water flowing through the inlet pipe 190 or through the top of the vault 184 collects in the vault 184 and comes into contact with at least one of the water treatment sub-systems 24 before flowing out of the vault 184 through the outlet pipe 192. The top of the vault 184 may be optionally covered by a cover (not shown) such that water enters the vault primarily through the inlet pipe 190.

IX. Eighth Example Water Treatment System

FIG. 16 depicts an eighth example water treatment system 220. The eighth example water treatment system 220 is formed by arranging a plurality of the example water treatment sub-systems 24 in a desired relationship relative to an earthen structure 222 supporting a vault 224 defining side walls 226 and a bottom wall 228. A grate 230 arranged on top of the vault direct water into the vault 224, and an outlet pipe 232 is arranged to allow water to flow out of the vault 224. A plurality of the water treatment sub-systems 24 are arranged on the bottom wall 228 of the vault 224 and stacked to a point above the outlet pipe 232. Water (e.g., surface water) flowing through grate openings 234 in the grate 230 enters the top of the vault 224, collects in the vault 224, and comes into contact with at least one of the water treatment sub-systems 24 before flowing out of the vault 224 through the outlet pipe 232.

X. Ninth Example Water Treatment System

FIGS. 17 and 18 depict a ninth example water treatment system 240. The ninth example water treatment system 240 is formed by arranging a plurality of the example water treatment sub-systems 24 in a desired relationship relative to an earthen structure 242 supporting a vault 244 defining side walls 246 and a bottom wall 248. A grate 250 arranged on top of the vault direct water into the vault 244, and an outlet pipe 252 is arranged to allow water to flow out of the vault 244. A plurality of the water treatment sub-systems 24 are supported from the grate 250 by one or more joining members 254. One end of the joining member or members 254 are extended through the loop portions 60-68, and ends of the joining member or members 254 are tied to the grate 250 such that the sub-systems 24 are suspended within the vault 244 above the bottom wall 248. Water (e.g., surface water) flowing through openings 256 in the grate 250 flows into the top of the vault 244 and comes into contact with at least one of the water treatment sub-systems 24 before flowing out of the vault 244 through the outlet pipe 252.

XI. Tenth Example Water Treatment System

Figure 19:
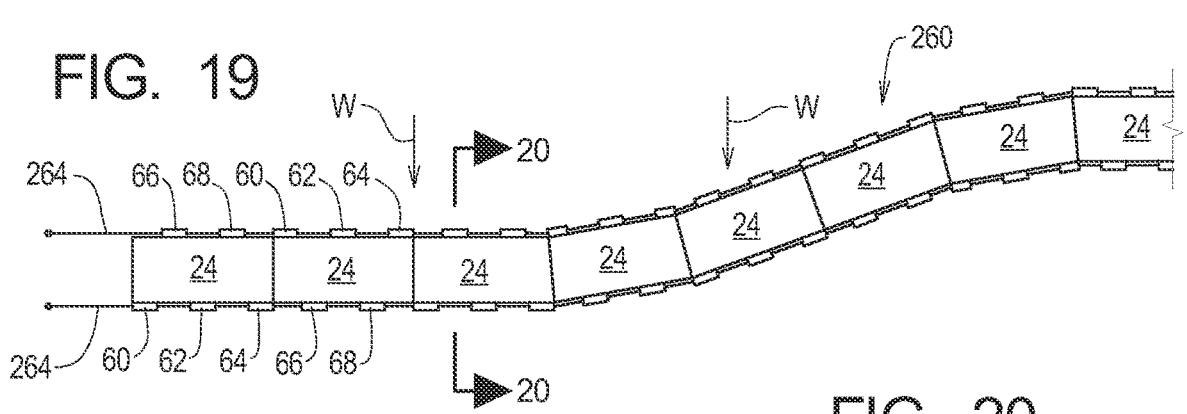
FIG. 19 is a top plan view illustrating a plurality of the first example water treatment sub-systems being joined by at least one joining member and arranged relative to a sixth example site configuration to form a tenth example water treatment system.
Figure 20:
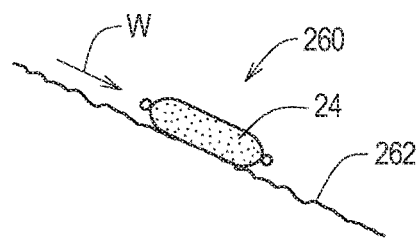
FIG. 20 is an end section view of the tenth example water treatment system taken along lines 20-20 in FIG. 19.

FIGS. 19 and 20 depict a tenth example water treatment system 260. The tenth example water treatment system 260 is formed by arranging a plurality of the example water treatment sub-systems 24 end to end row on an earthen structure 262. First and second joining members 264 are extended through the loop portions 60, 62, and 64 of one sub-system 24 and then through the loop portions 66 and 68 of the next sub-system 24 in the row. Alternatively, the first and second joining members 264 may be extended through the loop portions 60, 62, and 64 of one sub-system 24 and then through the loop portions 60, 62, and 64 of the next sub-system 24 in the row. The water treatment sub-systems 24 are stacked on the earthen structure such that water flowing along the earthen structure engages the row of treatment sub-systems 24. Flowing water W is treated when it comes into in contact with the example water treatment sub-systems 24.

XII. Eleventh Example Water Treatment System

Figure 21:
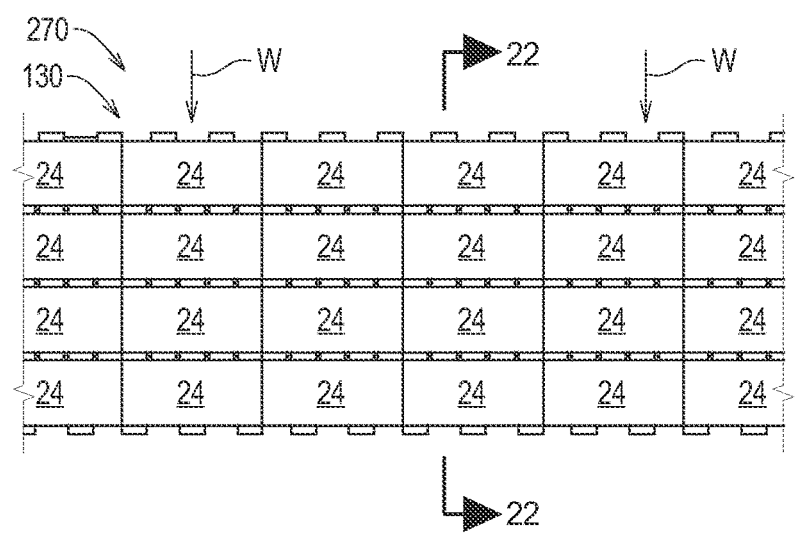
FIG. 21 is a top plan view illustrating a plurality of the first example water treatment sub-systems being joined by a plurality of joining members and arranged relative to a seventh example site configuration to form a eleventh example water treatment system.
Figure 22:
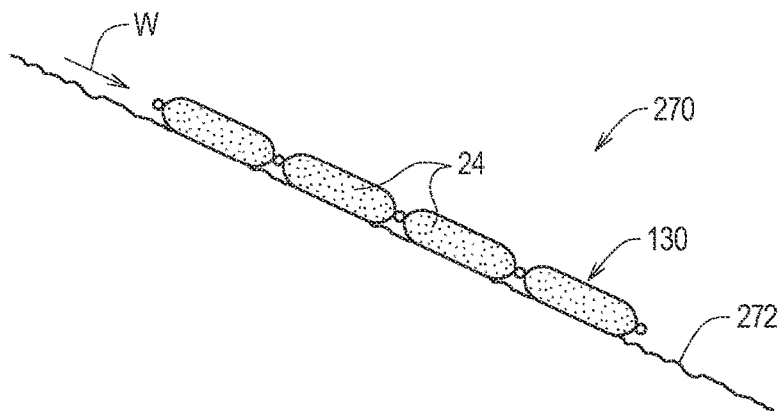
FIG. 22 is an end section view of the eleventh example water treatment system taken along lines 21-21 in FIG. 21.

FIGS. 21 and 22 depict an eleventh example water treatment system 270. The eleventh example water treatment system 270 is formed by arranging the second example water treatment system 130 on an earthen structure 272. The second example water treatment system 130 is arranged on the earthen structure such that water flowing along the earthen structure 272 engages the matrix of treatment sub-systems 24. Flowing water W is treated when it comes into in contact with the example water treatment sub-systems 24 forming the second example water treatment system 130.

XIII. Twelfth Example Water Treatment System

Figure 23:
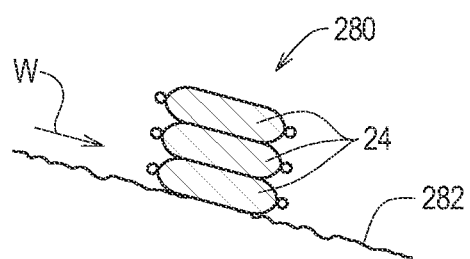
FIG. 23 is a side elevation view illustrating a plurality of the first example water treatment sub-systems arranged relative to an eighth example site configuration to form a twelfth example water treatment system.

FIG. 23 depicts a twelfth example water treatment system 280. The twelfth example water treatment system 280 is formed by arranging the fourth example water treatment system 150 on an earthen structure 282. The fourth example water treatment system 150 is arranged on the earthen structure such that water flowing along the earthen structure engages the stack of treatment sub-systems 24. Flowing water W is treated when it comes into in contact with the example water treatment sub-systems 24 forming the fourth example water treatment system 150.

XIV. Thirteenth Example Water Treatment System

Figure 24:
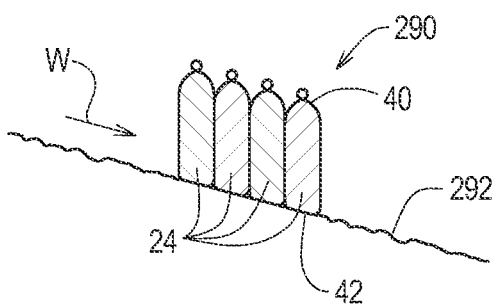
FIG. 24 is a side elevation view illustrating a plurality of the first example water treatment sub-systems arranged relative to a ninth example site configuration to form a thirteenth example water treatment system.

FIG. 24 depicts a thirteenth example water treatment system 290. The thirteenth example water treatment system 290 is formed by arranging a plurality of the water treatment sub-systems 24 surface to surface on their side edges 40 or 42 on an earthen structure 292. The water treatment sub-systems are arranged on the earthen structure 292 such that water flowing along the earthen structure engages the water treatment sub-systems 24. Flowing water W is treated when it comes into in contact with the example water treatment sub-systems 24 on the earthen structure 292.

XV. Fourteenth Example Water Treatment System

Figure 25:
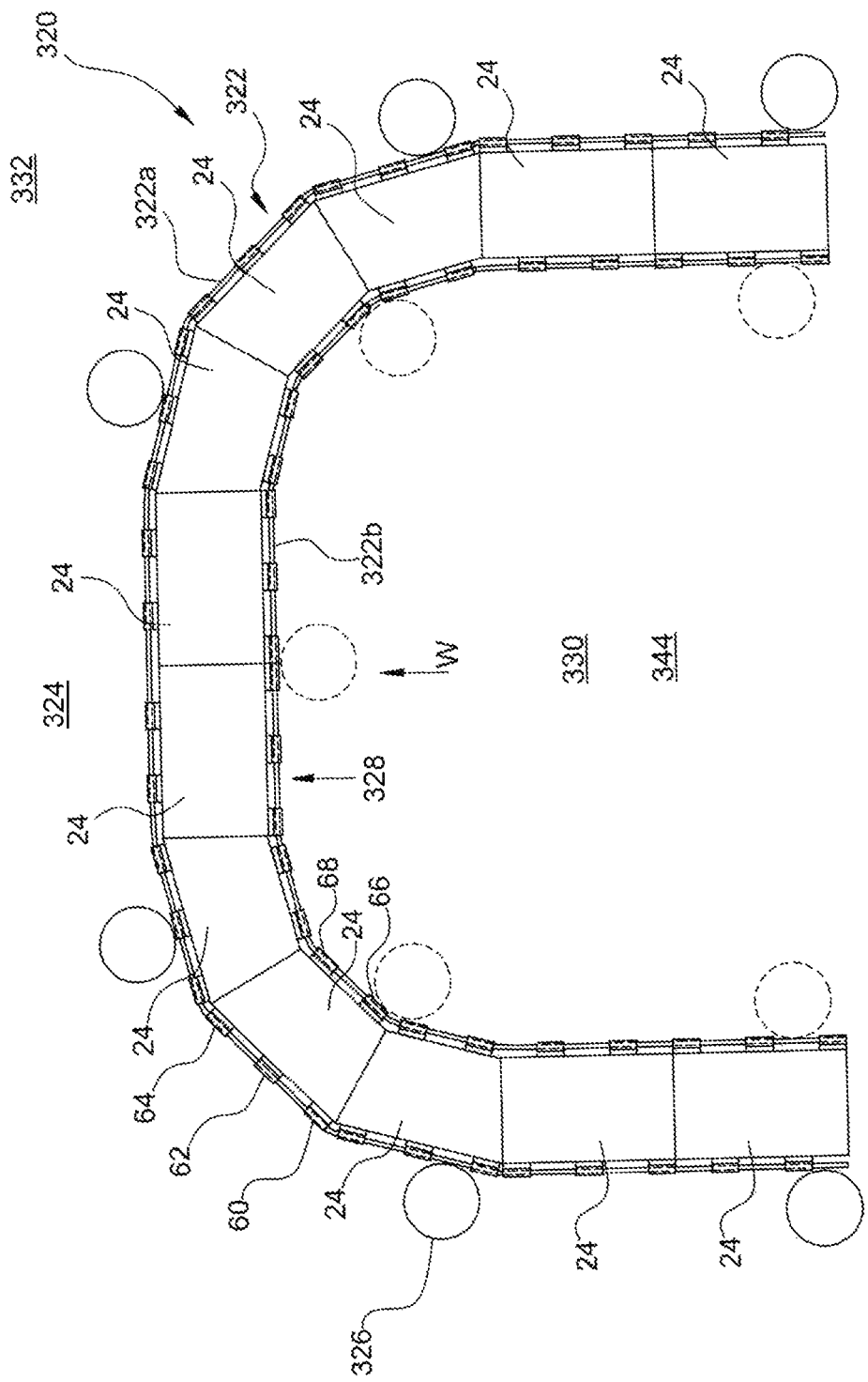
FIG. 25 is a top plan view illustrating a plurality of the first example water treatment sub-systems arranged to form a fourteenth example water treatment system.

FIG. 25 depicts a fourteenth example water treatment system 320 comprising a plurality of water treatment sub-systems such as the water treatment sub-systems 24 described above. The example water treatment system 320 takes the form of a floating boom. In particular, the water treatment sub-systems 24 are secured together by a rope system 322 and suspended relative to a body of water 324 by one or more buoyancy devices 326.

In the example water treatment system 320, the rope system 322 comprises a first rope portion 322a and a second portion rope 322b, and the first and second rope portions 322a and 322b extend through loop structures 60, 62, 64, 66, and/or 68 of the water treatment sub-systems 24 to hold the water treatment sub-systems 24 together. The sides of the water treatment sub-systems 24 supported by the second rope portion 322b define the boom edge 328.

In the example depicted FIG. 25, six of the buoyancy devices 326 are secured to the rope system 322 to the first rope portion 322a of the example water treatment system 320 opposite the boom edge 328. Optionally, five of the buoyancy devices 326 are secured to the second rope portion 322b along a second side of the example water treatment system 320 at the boom edge 328. Typically, but not necessarily, an anchor system (not shown) is used to secure the fifteenth example water treat system in a desired location and orientation.

Further, the rope system 322 holds adjacent corners of the water treatment sub-systems 24 along the boom edge 328 such that at least a portion of the water moving from a contained area 330 to an uncontained area 332 passes through at least a portion of the water treatment system 320. The water moving from the contained area 330 to the uncontained area 332 may be at any water level but is surface water in the example shown in FIG. 25. For example, if oil (not shown) is floating on the surface of the water, the buoyancy device(s) 326 and the anchor system will support the water treatment system 320 at the surface of the water such that the water treatment system 320 removes the oil from the surface of the water and/or prevented from flowing from the contained area 330 to the uncontained area 332. The example boom edge 328 shown in FIG. 25 defines a curved line but the boom edge 328 may be configured to define straight lines, circles, rectangles, and/or other shapes.

XVI. Fifteenth Example Water Treatment System

Figure 26:
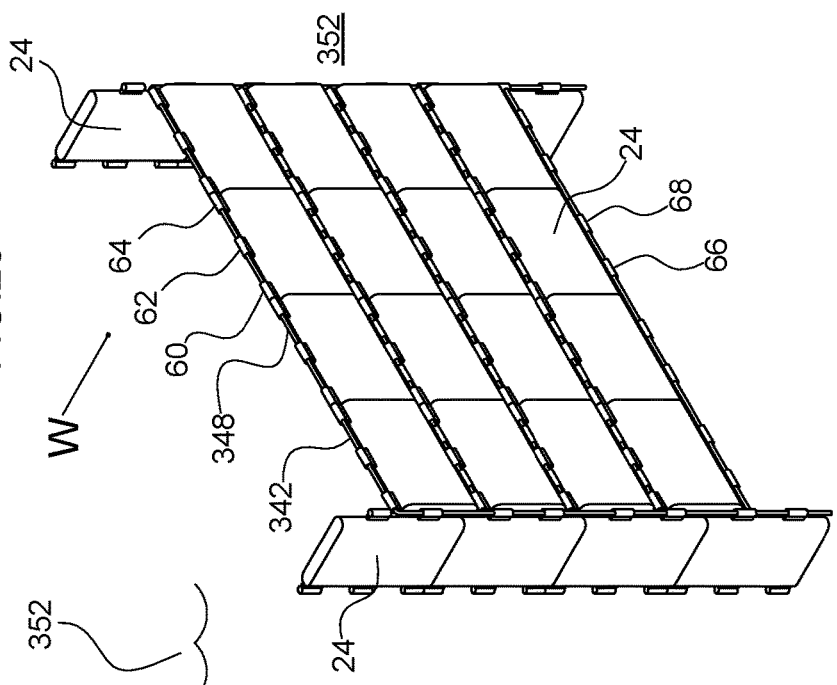
FIG. 26 is a perspective view illustrating a plurality of the first example water treatment sub-systems arranged to form a fifteenth example water treatment system.
Figure 27:
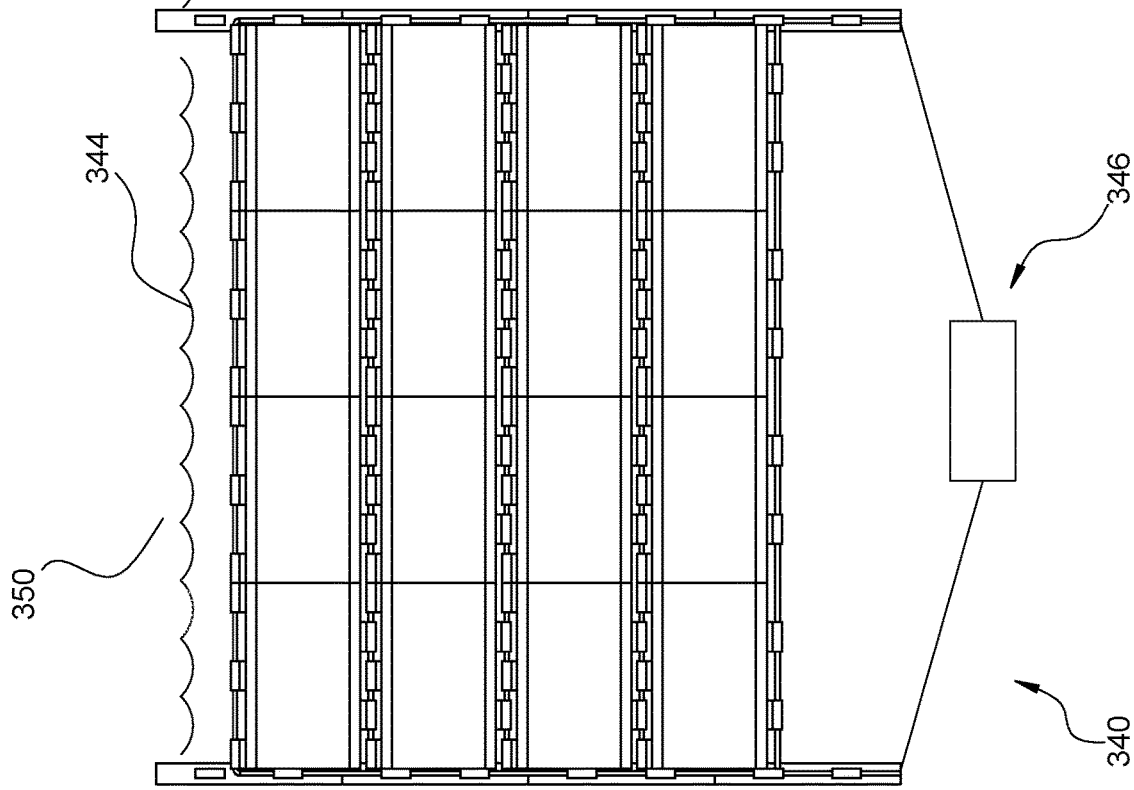
FIG. 27 is a front elevation view illustrating the fifteenth example water treatment system.
Figure 28:
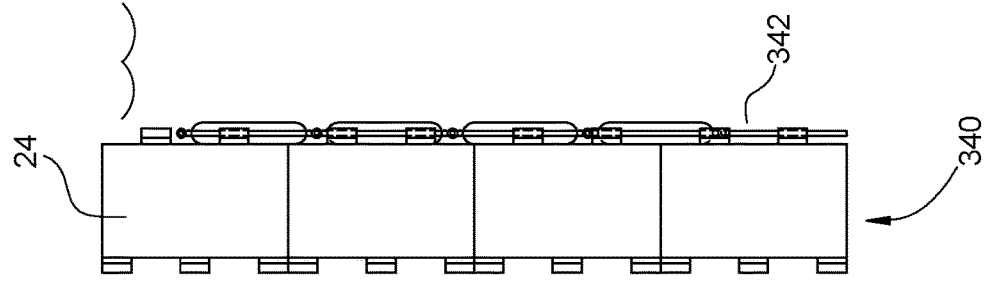
FIG. 28 is a side elevation view illustrating the fifteenth example water treatment system.

FIGS. 26-28 depict a fifteenth example water treatment system 340 comprising a plurality of water treatment sub-systems such as the water treatment sub-systems 24 described above. The example water treatment system 340 takes the form of a floating "curtain" or "weir" structure. In particular, the water treatment sub-systems 24 are secured together by a rope system 342 and suspended relative to a body of water 344 by one or more buoyancy devices (not shown). In the example water treatment system 340, the rope system 342 extends through loop structures 60, 62, 64, 66, and/or 68 of the water treatment sub-systems 24 to hold the water treatment sub-systems 24 to define a weir edge 348. Typically, but not necessarily, an anchor system 346 (FIG. 27) is used to secure the example water treat system 340 in a desired location and orientation.

In the example illustrated in FIG. 26-28, the rope system 342 holds adjacent edges of the water treatment sub-systems 24 to define the weir edge 348 such that at least a first portion of the water moving from a contained area 350 to an uncontained area 352 passes through at least a portion of the water treatment system 340 and at least a second portion of the water moving from the contained area 350 to the uncontained area 352 passes above the weir edge 348. The example water treatment system 340 thus allows water near the surface of the body of water 344 to flow freely between the contained area 350 and the uncontained area 352 but water below the surface (as defined by the height of the weir edge) must pass through the water treatment sub-systems 24 when flowing between the contained area 350 and the uncontained area 352.

XVII. Sixteenth Example Water Treatment System

Depicted in FIGS. 29-31 of the drawing is a sixteenth example water treatment system 420 of the present invention. The example water treatment system 420 comprises one or more water treatment sub-systems 422 that may be secured together by a rope system 424 as shown in FIGS. 30 and 31.

FIG. 29 illustrates that the example water treatment sub-system 422 comprises multi-chamber container 430 constructed in accordance with, and embodying, the principles of the present invention. The example multi-chamber container 430 is combined with remediation media such as the water treatment media 22 described above to form the example water treatment sub-system 422.

The example multi-chamber container 430 comprises first and second sub-chambers 432 and 434 that, when filled, are substantially cylindrical. In particular, the example multi-chamber container 430 comprises one or more panels 440 joined together by one or more stitches 442 to define first and second side edges 450 and 452 and first and second end edges 454 and 456. The second end edge 456 of the example multi-chamber container 430 defines first and second container openings 460 and 462 (FIG. 30) that allow access to the first and second sub-chambers 432 and 434, respectively.

The example panel(s) 440 is(are) made of a flexible material that functions to contain the remediation media 22 within the container chamber 52. The material forming the example panel 440 further allows water to soak or flow through the example water treatment container 20a to come into contact with the remediation media 22. The example panel(s) is(are) 440 made of a woven fabric. The example woven fabric from which the panel(s) 440 is(are) formed may be made of fibers and/or ribbons made of chemically resistant nylon, polypropylene, polyester, biodegradable cotton, or similar materials. The micron ratings of the material employed can be 0.5 to 400. The material from which the fabric is made is desirably nontoxic, does not release fibers during normal use, is user friendly, and is reusable.

The example multi-chamber container 430 further defines first, second, and third loop structures 470, 472, and 474 extending from the first side edge 450 and fourth and fifth loop structures 476 and 478 extending from the second side edge 452. The example multi-chamber container 430 further defines sixth and seventh loop structures 480 and 482 on the first end edge 454 and eighth and ninth loop structures 484 and 486 on the second end edge 456.

The example loop structures 470-478 and 480-486 are made of a fabric such as strapping material. The fabric from which the loop structures 470-478 and 480-486 are desirably formed of fibers and/or ribbons made of chemically resistant nylon, polypropylene, polyester, biodegradable cotton, or similar materials. The micron ratings of the material employed can be 0.5 to 400. The material from which the fabric is made is desirably nontoxic, does not release fibers during normal use, is user friendly, and is reusable. Like the example loop structures 60-68 discussed above, the loop structures 470-478 and 480-486 each defines a proximal loop portion and a distal loop portion and are formed by a strip of flexible material sewn in a loop.

The loop structures 470-478 and 480-486 are sized, dimensioned, and spaced such that the rope system 424 may be arranged to secure the water treatment sub-systems 422 together in different configurations. FIGS. 30 and 31 illustrate a simple case of two of the water treatment sub-systems 422 combined using the rope system 424.

First and second closure systems 490 and 492 are configured to allow the first and second openings 460 and 462 to be selectively opened and closed. As with the example closure system 90 described above, the closure systems 490 and 492 may be formed by a hook and loop fastener, a zipper with non-metallic or well-painted teeth and pulls, and/or pressure sensitive adhesive strips. The closure system 90 may be single use (e.g. pressure sensitive adhesive strip) or may be adapted to be selectively opened and closed for numerous uses (e.g. hook and loop fastener or zipper).

The example water treatment system 420 and water treatment sub-systems 422 can be used in lakes, streams, ponds, saltwater and fresh water wetlands, storm drains, catch basins, roadways, parking lots, bioretention, soil-water interface, or any other water treatment infrastructures or earthen structures. The example water treatment sub-systems including remediation media is capable of effectively removing contaminants from water including heavy metals, organic pollutants including PFOA, hydrocarbons, coliform, and *enterococcus* bacteria simultaneously.

XVIII. Seventeenth Example Water Treatment System

Figure 33:
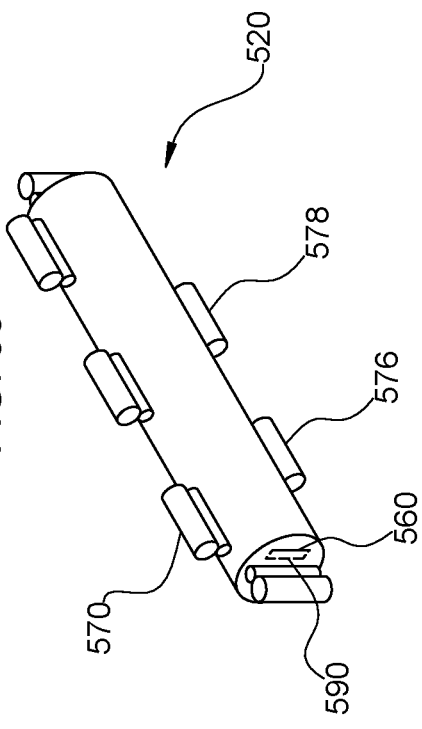
FIG. 33 is a perspective view illustrating an example cylindrical-chamber water treatment sub-system of the present invention.
Figure 32:
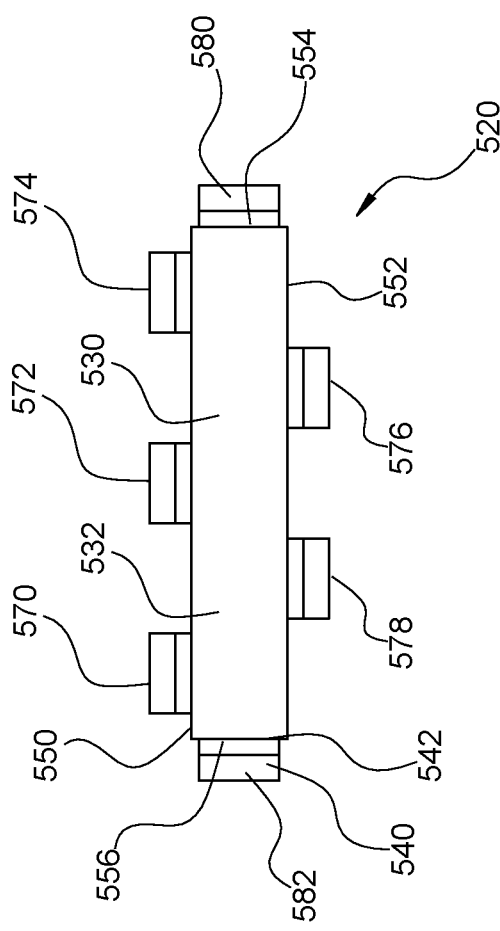
FIG. 32 is a front elevation view of an example cylindrical-chamber water treatment sub-system of the present invention.
Figure 34:
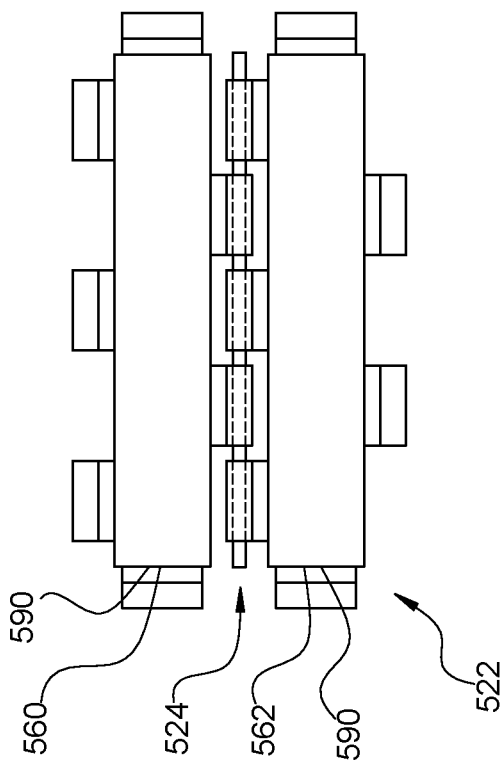
FIG. 34 is a front elevation view illustrating a plurality of the example cylindrical-chamber water treatment sub-systems arranged to form a seventeenth example water treatment system.

Depicted in FIGS. 32-34 of the drawing is a seventeenth example water treatment system 520 of the present invention. The example water treatment system 520 comprises one or more water treatment sub-systems 522 that may be secured together by a rope system 524 as shown in FIG. 34.

FIG. 34 further illustrates that the example water treatment sub-system 522 comprises cylindrical chamber container 530 constructed in accordance with, and embodying, the principles of the present invention. The example cylindrical chamber container 530 is combined with remediation media such as the water treatment media 22 described above to form the example water treatment sub-system 522.

The example cylindrical chamber container 530 comprises a single sub-chamber 532 that, when filled, is substantially cylindrical. In particular, the example cylindrical chamber container 530 comprises one or more panels 540 joined together by one or more stitches 542 to define first and second side edges 550 and 552 and first and second end edges 554 and 556. The second end edge 556 of the example cylindrical chamber container 530 defines a container opening 560 (FIG. 33) that allow access to the sub-chamber 532.

The example panel(s) is(are) made of a flexible material that functions to contain the remediation media 22 within the container chamber 530. The material forming the example panel(s) 540 further allows water to soak or flow through the example water treatment container 530 to come into contact with the remediation media 22. The example panel(s) 540 is(are) made of a woven fabric. The woven fabric from which the panel(s) 540 is(are) formed may be made of fibers and/or ribbons made of chemically resistant nylon, polypropylene, polyester, biodegradable cotton, or similar materials. The micron ratings of the material employed can be 0.5 to 500. The material from which the fabric is made is desirably nontoxic, does not release fibers during normal use, is user friendly, and is reusable.

The example cylindrical chamber container 530 further defines first, second, and third loop structures 570, 572, and 574 extending from the first side edge 550 and fourth and fifth loop structures 576 and 578 extending from the second side edge 552. The example cylindrical chamber container 530 further defines a sixth loop structure 580 on the first end edge 554 and a seventh loop structure 582 on the second end edge 556.

The example loop structures 570-578 and 580-582 are made of a fabric such as strapping material. The fabric from which the loop structures 570-578 and 580-582 are desirably formed may be made of fibers and/or ribbons made of chemically resistant nylon, polypropylene, polyester, biodegradable cotton, or similar materials. The micron ratings of the material employed can be 0.5 to 500. The material from which the fabric is made is desirably nontoxic, does not release fibers during normal use, is user friendly, and is reusable. Like the example loop structures 60-68 discussed above, the loop structures 570-578 and 580-582 each defines a proximal loop portion and a distal loop portion and are formed by a strip of flexible material sewn in a loop.

The loop structures 570-578 and 580-582 are sized, dimensioned, and spaced such that the rope system 524 may be arranged to secure the water treatment sub-systems 522 together in different configurations. FIG. 34 illustrates a simple case of two of the water treatment sub-systems 522 are combined using the rope system 524.

A closure system 590 is configured to allow the openings 560 and 562 to be selectively opened and closed. As with the example closure system 90 described above, the closure system 590 may be formed by a hook and loop fastener, a zipper with non-metallic or well-painted teeth and pulls, and/or pressure sensitive adhesive strips. The closure system 90 may be single use (e.g. pressure sensitive adhesive strip) or may be adapted to be selectively opened and closed for numerous uses (e.g. hook and loop fastener or zipper).

The example water treatment system 520 and water treatment sub-systems 522 can be used in lakes, streams, ponds, saltwater and fresh water wetlands, storm drains, catch basins, roadways, parking lots, bioretention, soil-water interface, or any other water treatment infrastructures or earthen structures. The example water treatment sub-systems including remediation media is capable of effectively removing contaminants from water including heavy metals, organic pollutants including PFOA, hydrocarbons, coliform, and *enterococcus* bacteria simultaneously.

XIX. Additional Considerations

Although reference is sometimes made or depicted herein to rectangular or square vaults, many are round. The water treatment sub-systems of the present invention are sufficiently flexible to press into corners and thereby can accommodate any shape vault, holding pond, container device (e.g., a down spout with a 55-gallon barrel as treatment device), or concrete structure (e.g., manholes). And as described above, the water treatment sub-systems of the present invention need not be joined or otherwise connected or "mated" together but may be utilized individually and molded to fit a particular operating environment. For example, the water treatment sub-systems may be molded to conform to the edge of a parking surface such as a movie lot in which contaminated water tends to sheet and then roll off.

What is claimed is:

1. A water treatment system comprising:
   first and second containers each defining a container chamber, a container opening, and at least one container edge, where the container opening allows access to the container chamber;
   first and second closure systems arranged to allow the container openings of the first and second containers, respectively, to be selectively opened and closed;
   at least one loop structure secured to the at least one container edge of each of the first and second containers, where the at least one loop structure defines a proximal loop opening and a distal loop opening configured such that the proximal loop opening is arranged between the distal loop opening and the at least one container edge;
   remediation media disposed within the container chambers of the first and second containers; and
   a joining member configured to extend through either of the proximal loop opening and the distal loop opening of the at least one loop structure of the first and second containers; wherein
   the joining member is configured to extend through at least one of the proximal loop opening and the distal loop opening defined by the at least one loop structure of the first and second containers such that the joining member inhibits movement of the first container relative to the second container, and the first container is arranged relative to the second container in a first configuration such that the at least one loop structure of the first container is adjacent to the at least one loop structure of the second container, and the joining member is arranged to extend through the proximal loop opening of each of the first and second containers such that the distal loop openings of the first and second containers are unused, the joining member inhibits movement of the first container relative to the second container, and when the joining member inhibits movement of the first and second containers in the first configuration, the at least one container edge of the first container may be spaced a first distance from the at least one container edge of the second container;

the first container is arranged relative to the second container in a second configuration such that the at least one loop structure of the first container is adjacent to at the least one loop structure of the second container, and the joining member is arranged to extend through the distal loop opening of each of the first and second containers such that the proximal loop openings of the first and second containers are unused, the joining member inhibits movement of the first container relative to the second container, and when the joining member inhibits movement of the first and second containers in the second configuration, the at least one container edge of the first container may be spaced a second distance from the at least one container edge of the second container, where the second distance is greater than the first distance; and the first and second containers are formed of material that allows water to pass from an exterior of the first and second containers to the container chambers of the first and second containers and thereby come into contact with the remediation media within the container chambers of the first and second containers.

2. A water treatment system as recited in claim 1, in which at least one of the first and second containers is made of woven fabric.

3. A water treatment system as recited in claim 2, in which the woven fabric is made of at least one of fibers and ribbons.

4. A water treatment system as recited in claim 2, in which the woven fabric is made of at least one of nylon, polypropylene, polyester, and cotton.

5. A water treatment system as recited in claim 1, in which:

the second container defines a plurality of the at least one loop structure; and the first container is arranged relative to the second container such that the at least one loop structure of the first container is arranged between two loop structures of the plurality of the at least one loop structure of the second container.

6. A water treatment system as recited in claim 1, in which the material forming at least one of the first and second containers is biodegradable.

\* \* \* \* \*